United States Patent
Adams et al.

(10) Patent No.: US 10,494,864 B2
(45) Date of Patent: *Dec. 3, 2019

(54) MOTORIZED WINDOW TREATMENT

(71) Applicant: Lutron Technology Company LLC, Coopersburg, PA (US)

(72) Inventors: Jason O. Adams, Emmaus, PA (US); Edward J. Blair, Telford, PA (US); Andrew Karl Cooney, Quakertown, PA (US); Soumya Jain, Maharashta (IN); David A. Kirby, Zionsville, PA (US); Stephen Lundy, Coopersburg, PA (US); Justin J. Mierta, Allentown, PA (US); Daniel W. Mistarz, Allentown, PA (US); Robert C. Newman, Jr., Emmaus, PA (US); Peter W. Ogden, Jr., Breinigsville, PA (US); Jonathan L. Roe, Coopersburg, PA (US); Chen Ming Wu, Emmaus, PA (US); Justin M. Zernhelt, New York, NY (US); Samuel F. Chambers, Gwynedd Valley, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 143 days.

This patent is subject to a terminal disclaimer.

(21) Appl. No.: 15/607,056

(22) Filed: May 26, 2017

(65) Prior Publication Data

US 2017/0260808 A1 Sep. 14, 2017

Related U.S. Application Data

(60) Division of application No. 14/690,914, filed on Apr. 20, 2015, now Pat. No. 9,810,020, which is a
(Continued)

(51) Int. Cl.
*E06B 9/68* (2006.01)
*E06B 9/72* (2006.01)
(Continued)

(52) U.S. Cl.
CPC .................. *E06B 9/72* (2013.01); *E06B 9/32* (2013.01); *E06B 9/322* (2013.01); *E06B 9/323* (2013.01);
(Continued)

(58) Field of Classification Search
CPC ..... E06B 2009/6809; E06B 2009/6818; E06B 2009/6845; E06B 2009/6854;
(Continued)

(56) References Cited

U.S. PATENT DOCUMENTS 2,802,523 A  8/1957  Anderle
3,169,006 A  2/1965  Lorentzen et al.
(Continued)

FOREIGN PATENT DOCUMENTS

CN  2141456 Y  9/1993
CN  1104289 A  6/1995
(Continued)

OTHER PUBLICATIONS

Chinese Office Action and Written Opinion dated Nov. 4, 2015 issued in related Chinese Patent Application No. 201410483953.8.
(Continued)

*Primary Examiner* — Johnnie A. Shablack
(74) *Attorney, Agent, or Firm* — Amy Yanek; Glen Farbanish; Philip Smith

(57) ABSTRACT

A motorized window treatment may provide a low-cost solution for controlling the amount of daylight entering a space through a window. The window treatment may include a covering material (e.g., a cellular shade fabric or a roller shade fabric), a drive assembly for raising and lowering the
(Continued)

covering material, and a motor drive unit including a motor configured to drive the drive assembly to raise and lower the covering material. The motorized window treatment may comprise one or more battery packs configured to receive batteries for powering the motor drive unit. The batteries may be located out of view of a user of the motorized window treatment (e.g., in a headrail or in a battery compartment). The motorized window treatment may use various power-saving methods to lengthen the lifetime of the batteries, e.g., to reduce the motor speed to conserve additional battery power and extend the lifetime of the batteries.

27 Claims, 21 Drawing Sheets

Related U.S. Application Data continuation-in-part of application No. 14/579,024, filed on Dec. 22, 2014, now Pat. No. 9,605,478, which is a division of application No. 13/415,084, filed on Mar. 8, 2012, now Pat. No. 8,950,461.

(60) Provisional application No. 61/547,319, filed on Oct. 14, 2011, provisional application No. 61/530,799, filed on Sep. 2, 2011, provisional application No. 61/451,960, filed on Mar. 11, 2011.

(51) Int. Cl.
  *E06B 9/32*      (2006.01)
  *E06B 9/322*     (2006.01)
  *H04W 52/02*     (2009.01)
  *E06B 9/323*     (2006.01)
  *E06B 9/42*      (2006.01)
  *E06B 9/62*      (2006.01)
  *E06B 9/262*     (2006.01)

(52) U.S. Cl.
  CPC ........... *E06B 9/42* (2013.01); *H04W 52/0238* (2013.01); *H04W 52/0245* (2013.01); *H04W 52/0277* (2013.01); *E06B 9/62* (2013.01); *E06B 2009/2625* (2013.01); *E06B 2009/6809* (2013.01); *E06B 2009/6818* (2013.01); *E06B 2009/6872* (2013.01); *H04W 52/0287* (2013.01); *Y02D 70/00* (2018.01)

(58) Field of Classification Search
  CPC ..... E06B 2009/3222; E06B 2009/2625; E06B 9/68; E06B 9/70; E06B 9/72; E06B 9/38; E06B 9/32; E06B 9/322; E06B 9/60; E06B 9/62; H04W 52/0238; H04W 52/0245; H04W 52/0277; H04W 52/028; H04W 52/0287; Y02D 70/00; Y02B 80/50
  USPC ........ 160/1, 84.02, 170, 171, 188, 189, 190, 160/DIG. 17
  See application file for complete search history.

(56) References Cited

U.S. PATENT DOCUMENTS

| | | |
|---|---|---|
| 4,395,135 A | 7/1983 | Frantz |
| 5,063,984 A | 11/1991 | Cherveny |
| 5,134,347 A | 7/1992 | Koleda |
| 5,212,478 A | 5/1993 | Moseley |
| 5,391,967 A | 2/1995 | Domel et al. |
| 5,406,176 A | 4/1995 | Sugden |
| 5,413,161 A | 5/1995 | Corazzini |
| 5,467,808 A | 11/1995 | Bell |
| 5,482,100 A | 1/1996 | Kuhar |
| 5,531,257 A | 7/1996 | Kuhar |
| 5,682,157 A | 10/1997 | Asmussen et al. |
| 5,760,558 A | 6/1998 | Popat |
| 5,793,174 A | 8/1998 | Kovach et al. |
| 5,848,634 A | 12/1998 | Will et al. |
| 5,883,480 A | 3/1999 | Domel et al. |
| 5,982,519 A | 11/1999 | Martnelli et al. |
| 5,990,646 A | 11/1999 | Kovach et al. |
| 6,057,658 A | 5/2000 | Kovach et al. |
| 6,064,949 A | 5/2000 | Werner et al. |
| 6,121,889 A | 9/2000 | Janda et al. |
| 6,181,089 B1 | 1/2001 | Kovach et al. |
| 6,199,617 B1 | 3/2001 | Schweiss |
| 6,259,218 B1 | 7/2001 | Kovach et al. |
| 6,369,530 B2 | 4/2002 | Kovach et al. |
| 6,433,498 B1 | 8/2002 | Domel et al. |
| 6,497,267 B1 | 12/2002 | Azar et al. |
| 6,545,434 B2 | 4/2003 | Sembhi et al. |
| 6,580,017 B1 | 6/2003 | Echelard et al. |
| 6,605,910 B2 | 8/2003 | Mullet et al. |
| 6,781,335 B2 | 8/2004 | Osinga et al. |
| 6,812,662 B1 | 11/2004 | Walker |
| 6,819,081 B2 | 11/2004 | Izawa et al. |
| 6,841,971 B1 | 1/2005 | Spee et al. |
| 6,984,951 B2 | 1/2006 | Osinga et al. |
| 7,389,806 B2 | 6/2008 | Kates |
| 7,401,634 B2 | 7/2008 | Kovach et al. |
| 7,417,785 B2 | 8/2008 | Malvino |
| 7,424,905 B2 | 9/2008 | Lai |
| 7,466,090 B2 | 12/2008 | Meewis et al. |
| 7,617,857 B2 | 11/2009 | Froese |
| 7,673,667 B2 | 3/2010 | Domel et al. |
| 7,719,215 B2 | 5/2010 | Meewis et al. |
| 7,772,798 B2 | 8/2010 | Rodas et al. |
| 7,783,277 B2 | 8/2010 | Walker et al. |
| 7,839,109 B2 | 11/2010 | Carmen et al. |
| 7,940,167 B2 | 5/2011 | Steiner et al. |
| 7,971,086 B2 | 6/2011 | Itkin |
| 7,975,748 B2 | 7/2011 | Yu et al. |
| 8,009,042 B2 | 8/2011 | Steiner et al. |
| 8,950,461 B2 * | 2/2015 | Adams ............... E06B 9/32 160/84.02 |
| 9,605,478 B2 * | 3/2017 | Adams ............... E06B 9/32 |
| 9,810,020 B2 * | 11/2017 | Adams ............... E06B 9/72 |
| 10,041,292 B2 * | 8/2018 | Cooney ............. E06B 9/32 |
| 2005/0087394 A1 | 4/2005 | Toti |
| 2005/0215210 A1 | 9/2005 | Walker et al. |
| 2007/0089841 A1 | 4/2007 | Rossato et al. |
| 2008/0128097 A1 | 6/2008 | Yu et al. |
| 2008/0150461 A1 | 6/2008 | Adamus et al. |
| 2008/0202708 A1 | 8/2008 | Opendo |
| 2008/0204856 A1 | 8/2008 | Malvino |
| 2008/0236763 A1 | 10/2008 | Kates |
| 2008/0260363 A1 * | 10/2008 | Carmen ............ E06B 9/68 388/811 |
| 2009/0174217 A1 | 7/2009 | Lawall et al. |
| 2009/0199975 A1 | 8/2009 | Yeh |
| 2009/0251352 A1 | 10/2009 | Altonen et al. |
| 2009/0308543 A1 | 12/2009 | Kates |
| 2010/0052574 A1 | 3/2010 | Blakeley et al. |
| 2010/0052576 A1 | 3/2010 | Steiner et al. |
| 2010/0154999 A1 | 6/2010 | Oh et al. |
| 2010/0225240 A1 | 9/2010 | Shearer et al. |
| 2010/0244709 A1 | 9/2010 | Steiner et al. |
| 2010/0269988 A1 | 10/2010 | Mullet et al. |
| 2011/0080110 A1 | 4/2011 | Nuhfer et al. |
| 2011/0203748 A1 | 8/2011 | Mullet et al. |
| 2011/0272106 A1 | 11/2011 | Mullet et al. |
| 2012/0032626 A1 | 2/2012 | Tranchand et al. |
| 2012/0068686 A1 | 3/2012 | Steiner et al. |
| 2012/0073765 A1 | 3/2012 | Hontz et al. |
| 2012/0125543 A1 | 5/2012 | Chambers et al. |
| 2017/0260806 A1 | 9/2017 | Adams et al. |
| 2017/0260808 A1 * | 9/2017 | Adams ............... E06B 9/72 |

(56) References Cited

U.S. PATENT DOCUMENTS

FOREIGN PATENT DOCUMENTS

| | | |
|---|---|---|
| CN | 101317203 A | 12/2008 |
| CN | 101824958 A | 9/2010 |
| EP | 0886030 A2 | 12/1998 |
| EP | 2209249 A2 | 7/2010 |
| WO | WO1997018501 A1 | 5/1997 |
| WO | WO2005093682 A1 | 10/2005 |
| WO | WO2007055574 A1 | 5/2007 |

OTHER PUBLICATIONS

Chinese Office Action dated Dec. 31, 2014 issued in related Chinese Patent Application No. 201280012632.9.
Cutler-Hammer application note dated Oct. 2002, pp. 1-4.
Dataweek Electronics & Communications Technology; Issue Date Jun. 4, 2003; Voltage detector IC helps prevent battery leakage; Technews Publishing (PTY) Ltd; http://www.dataweek.co.za/news.aspx?pkInewsid=10676.
Freescale Semiconductor; Application Note AN3053; Rev. 1, Mar. 2008; Infrared Remote Control Techniques on MC9S08RC/RD/RE/RG Family; by Pavel Lajsner; Freescale Semiconductor, Inc., 2005, 2008.
International Search Report and Writen Opinion dated Nov. 15, 2012 in corresponding International Application No. PCT/US2012/028315.
International Search Report and Writen Opinion dated Sep. 26, 2013 in corresponding International Application No. PCT/US2012/028329.
Popular Electronics dated Feb. 1968, front cover and p. 86.
Texas Instruments; LM317; SLVS044U—Sep. 1997—Revised Apr. 2008; 3-Terminal Adjustable Regulator.

\* cited by examiner

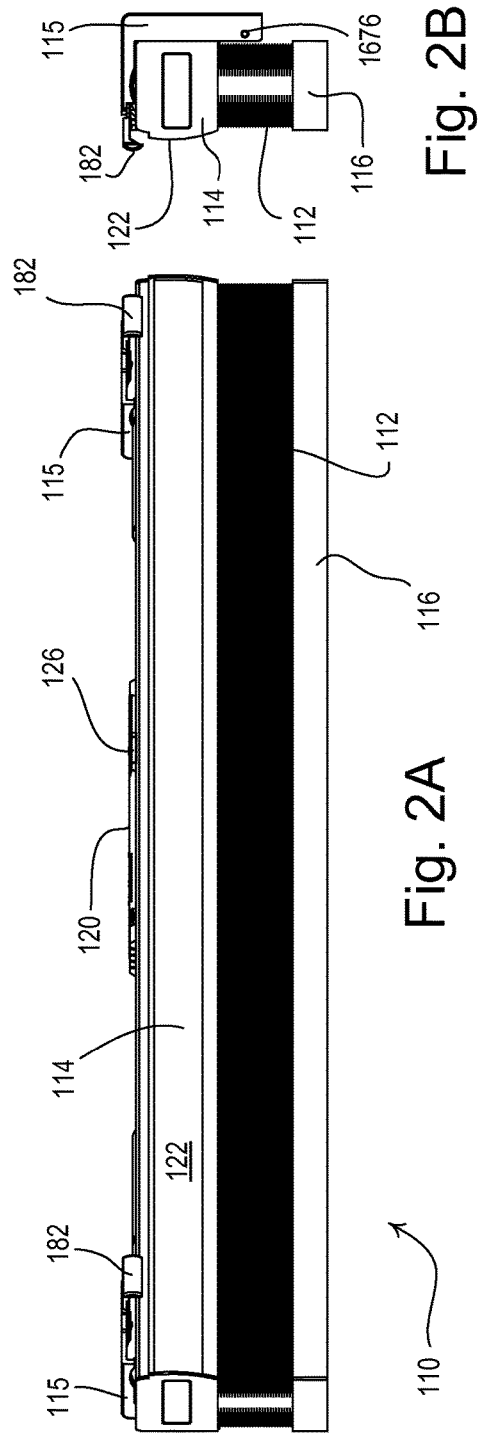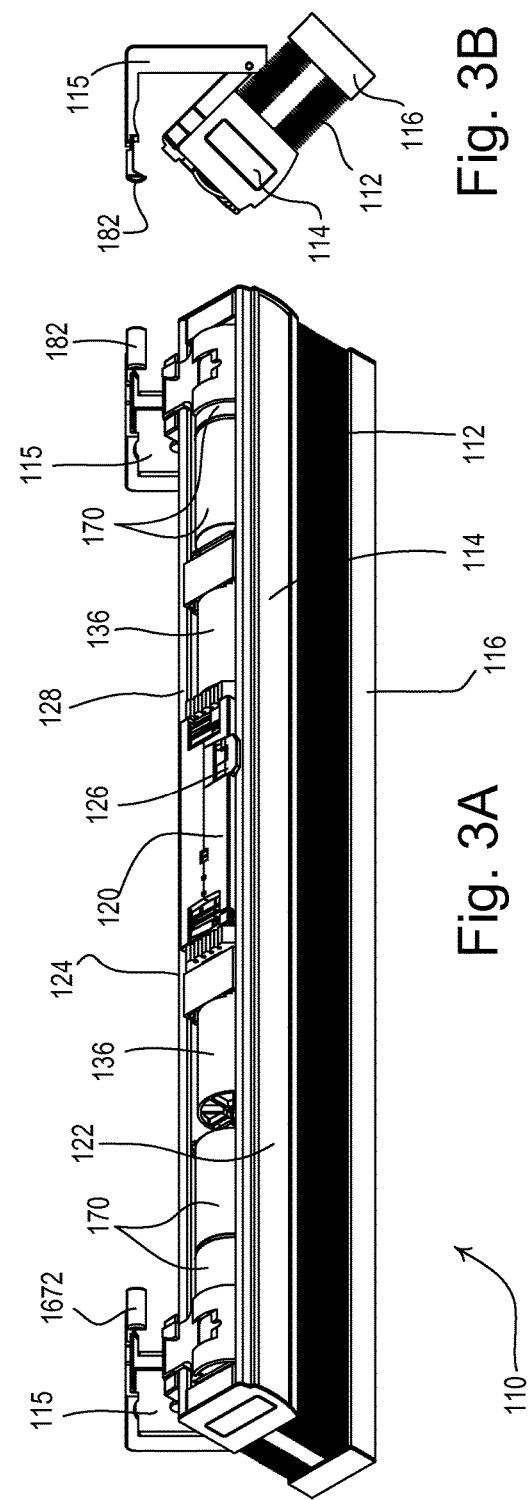

MOTORIZED WINDOW TREATMENT

CROSS REFERENCES TO RELATED APPLICATIONS

This application is a divisional of U.S. patent application Ser. No. 14/690,914, filed Apr. 20, 2015, now U.S. Pat. No. 9,810,020, issued Nov. 7, 2017, which is a continuation-in-part of U.S. patent application Ser. No. 14/579,024, filed Dec. 22, 2014, now U.S. Pat. No. 9,605,478, issued Mar. 28, 2017, which is a divisional application of U.S. patent application Ser. No. 13/415,084, filed Mar. 8, 2012, now U.S. Pat. No. 8,950,461, issued Feb. 10, 2015, which is a non-provisional application of commonly-assigned U.S. Provisional Application No. 61/451,960, filed Mar. 11, 2011; U.S. Provisional Application No. 61/530,799, filed Sep. 2, 2011; and U.S. Provisional Application No. 61/547,319, filed Oct. 11, 2011, all entitled MOTORIZED WINDOW TREATMENT, the entire disclosures of which are hereby incorporated by reference.

BACKGROUND

Field of the Invention

The present invention relates to a motorized window treatment, and more specifically, to a low-cost, quiet, battery-powered motorized window treatment that is characterized by an ultra-low power consumption that makes battery power more convenient for a user and results in long and practical battery lifetimes. In addition, the present invention relates to a battery-powered motorized window treatment that is controlled in response to wireless input signals and may be installed without requiring any additional wiring.

Description of the Related Art

Motorized window treatments typically include a flexible fabric or other means for covering a window in order to block or limit the daylight entering a space and to provide privacy. The motorized window treatments may comprise roller shades, cellular shades, Roman shades, Venentian blinds, and draperies. The motorized window treatments include a motor drive for movement of the fabric in front of the window to control the amount of the window that is covered by the fabric. For example, a motorized roller shade includes a flexible shade fabric wound onto an elongated roller tube with an electronic drive unit installed in the roller tube. The electronic drive unit includes a motor, such as a direct-current (DC) motor, which is operable to rotate the roller tube upon being energized by a DC voltage.

Prior art electronic drive units are typically powered directly from an AC mains line voltage (e.g., 120 VAC) or from a low-voltage DC voltage (e.g., approximately 24 VDC) provided by an external transformer. Unfortunately, this requires that electrical wires to be run from the power source to the electronic drive unit. Running additional AC main line voltage wiring to the electronic drive unit can be very expensive, due to the cost of the additional electrical wiring as well as the cost of installation. Typically, installing new AC main line voltage wiring requires a licensed electrician to perform the work. In addition, if the pre-existing wiring runs behind a fixed ceiling or wall (e.g., one comprising plaster or expensive hardwood), the electrician may need to breach the ceiling or wall to install the new electrical wiring, which will thus require subsequent repair. In some installations where low voltage (e.g., from a low-voltage DC transformer) is used to the power the electronic drive unit, the electrical wires have been mounted on an external surface of a wall or ceiling between the electronic drive unit and the transformer, which is plugged into an electrical receptacle. However, this sort of installation requires the permanent use of one of the outlets of the electrical receptacle and is aesthetically unpleasing due to the external electrical wires.

Therefore, some prior art motorized window treatments have been battery powered, such that the motorized window treatments may be installed without requiring any additional wiring. Examples of prior art battery-powered motorized window treatments are described in greater detail in U.S. Pat. No. 5,883,480, issued Mar. 16, 1999, entitled WINDOW COVERING WITH HEAD RAIL-MOUNTED ACTUATOR; U.S. Pat. No. 5,990,646, issued Nov. 23, 2009, entitled REMOTELY-CONTROLLED BATTERY POWERED-WINDOW COVERING HAVING POWER SAVING RECEIVER; and U.S. Pat. No. 7,389,806, issued Jun. 24, 2008, entitled MOTORIZED WINDOW SHADE SYSTEM.

However, the typical prior art battery-powered motorized window treatments have suffered from poor battery life (such as, one year or less), and have required batteries that are difficult and expensive to replace. Thus, there is a need for a low-cost battery-powered motorized window treatment that has longer battery life and makes battery power practical and convenient for the end user.

SUMMARY

As described herein, a low-cost, quiet, battery-powered motorized window treatment is configured to control the position of a covering material (e.g., a cellular shade fabric or a roller shade fabric) that is adapted to hang in front of an opening, such as a window. The motorized window treatment may comprise a motor drive unit having a motor for driving a drive assembly to raise and lower the covering material. The motorized window treatment may comprise one or more battery packs configured to receive batteries for powering the motor drive unit of the motorized window treatment. The batteries may not be expensive to replace and may have a much longer (and more practical) lifetime than the typical prior art battery-powered motorized window treatment (e.g., approximately three years). The batteries may be located out of view of a user of the motorized window treatment (e.g., in a headrail or in a battery compartment). The motorized window treatment may be adjusted to a service position to provide access to the batteries to allow for easy replacement of the batteries without unmounting any portion of the motorized window treatment. In addition, the motorized window treatment may make battery power more convenient for the user by controlling the motor at a reduced speed when the battery voltage is low (e.g., to harvest the remaining battery power and to signal to the user that the batteries need to be replaced) and by preventing movement of the covering material when the battery voltage is too low (e.g., to reserve enough energy to move the covering material to the fully-raised position one last time).

The motorized window treatment may be configured to receive input signals from input devices to allow for both local and central control of the position of the covering material. For example, the motorized window treatment may be configured to receive radio-frequency (RF) signals from one or more RF transmitters. The input devices of the load control system may comprise, for example, battery-powered remote controls, occupancy sensors, vacancy sensors, daylight sensors, temperature sensors, humidity sensors, security sensors, proximity sensors, keypads, key fobs, cell phones, smart phones, tablets, personal digital assistants, personal computers, timeclocks, audio-visual controls, safety devices, central control transmitters, or any combination of these input devices.

Since the motorized window treatment is battery-powered and is configured to be controlled in response to wireless input signals transmitted by an input device, the motorized window treatment may be installed without requiring any additional wiring. The motorized window treatment may be easily programmed to operate in response to the wireless signals transmitted by the input device. In addition, the upper and lower limits of the motorized window treatment may be easily programmed using the input device. The battery-powered motorized window treatment may also be integrated as part of a larger load control system, such as, an RF load control system, and may be configured to transmit digital messages including, for example, data regarding the battery voltage of the batteries, or the temperatures measured by the temperature sensors.

The motorized window treatment may use various power-saving methods to lengthen the lifetime of the batteries. For example, the motorized window treatment may comprise a constant-force spring operatively coupled to a drive shaft and a motor of the motorized window treatment for reducing the amount of power consumed as the covering material is raised and lowered. If the motorized window treatment includes an RF receiver for receiving RF signals, the motorized window treatment may be configured to use an RF sub-sampling technique to put the RF receiver to sleep for longer periods of time than typical prior art RF receivers to thus conserve battery power. When the battery voltage is low (i.e., near the end of the lifetime of the batteries), the motorized window treatment may be configured to reduce the speed at which the motor rotates to conserve additional battery power and thus extend the lifetime of the batteries.

As described herein, a motorized window treatment may comprise a covering material, a drive assembly configured to raise and lower the covering material, and a motor drive unit including a motor configured to drive the drive assembly to raise and lower the covering material between a fully-open position and a fully-closed position and to any position intermediate the fully-open and fully-closed positions. The motorized window treatment may further comprise at least one battery pack configured to hold at least one battery for producing a battery voltage to power the motor drive unit. The motor drive unit may be configured to monitor the magnitude of the battery voltage, the motor drive unit further configured to operate the motor at a reduced motor speed when the state of charge is reduced below a first predetermined threshold.

In addition, a motorized window treatment may also comprise a motor drive unit configured to determine when the magnitude of the battery voltage is too low for continued operation and reserve enough energy in the battery to allow for at least one additional movement of the covering material to the fully-open position.

A motor drive unit for a motorized window treatment may comprise a motor, a controller configured to drive the motor to adjust the position of the covering material, and a power supply configured to receive the battery voltage and generate a DC supply voltage having a first nominal magnitude for powering the controller. The controller may be configured to increase the magnitude of the DC supply voltage to a second increased magnitude greater than the first magnitude when the controller is driving the motor to raise and lower the covering material.

Further, a motorized window treatment may comprise a motor drive unit including a rotational position sensor to enable the motor drive unit to sense movement of an output shaft of a motor. The controller may be configured to determine the position of a bottom end of a covering material in response to the rotational position sensor. The motor drive unit may also comprise a memory coupled to the controller to store position data related to the determined position. The motorized window treatment may also comprise at least one battery pack configured to hold at least one battery for producing a battery voltage to power the motor drive unit, and a supplemental power source for the controller. The supplemental power source may be configured to maintain a charged voltage for a period of time adequate to maintain the position date when the at least one battery is removed from the battery pack. The at least one battery may be removed from the battery pack without loss of the position data.

In addition, a motorized window treatment may comprise a covering material that may be engageable by a user to manually position the covering material at any position between a fully-open and a fully-closed position. The motorized window treatment may comprise a motor drive unit having a rotational position sensor that may be configured to provide at least one sensor signal to a controller so that the controller can determine the position of the covering material when the covering material is manually adjusted.

As described herein, a motorized window treatment may also comprise: (1) a headrail having opposite ends; (2) a covering material that has a top end connected to the headrail and extends from the headrail to a bottom end; (3) a motor drive unit including a motor and located in the center of the headrail; (4) two drive shafts extending from both sides of the motor drive unit and rotatably coupled to the motor drive unit thereby allowing rotations of the motor to result in rotations of the drive shafts; (5) first and second lift cords, the first lift cord located proximate to the first opposite end of the headrail and the second lift cord located proximate to the second opposite end of the headrail, each lift cord rotatably received around a respective one of the drive shafts and extending vertically to the bottom end of the covering material; and (6) first and second battery packs configured to hold respective first and second batteries for powering the motor drive unit, the first and second battery packs located on each side of the motor drive unit, the first battery pack located between the first opposite end of the headrail and the first lift cord, and the second battery pack located between the second opposite end of the headrail and the second lift cord. The motor drive unit may be configured to rotate the drive shaft to adjust the bottom end of the covering material between a fully-closed position and a fully-open position in response to rotations of the drive shaft.

BRIEF DESCRIPTION OF THE DRAWINGS

FIG. 2A is a perspective view of the battery-powered motorized window treatment of FIG. 1 in a full-opened position.

FIG. 2B is a right side view of the battery-powered motorized window treatment of FIG. 1.

FIG. 3A is a perspective view of the motorized window treatment of FIG. 1 when the motorized window treatment is in a service position.

FIG. 3B is a right side view of the motorized window treatment of FIG. 1 when the motorized window treatment is in the service position.

DETAILED DESCRIPTION

Figure 1:
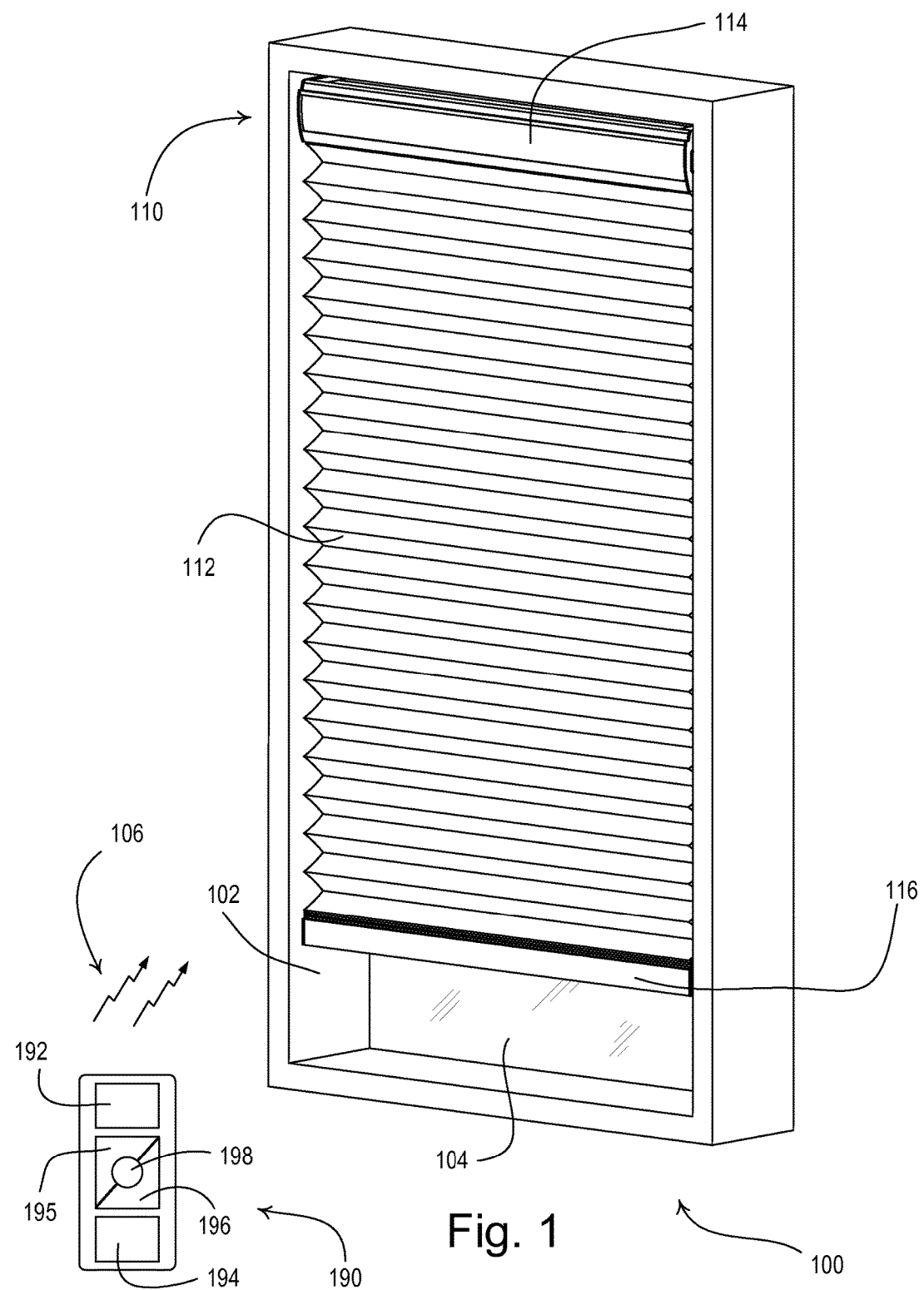
FIG. 1 is a perspective view of a motorized window treatment system having a battery-powered motorized window treatment and a remote control.

The foregoing summary, as well as the following detailed description of the preferred embodiments, is better understood when read in conjunction with the appended drawings.

For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a perspective view of a motorized window treatment system 100 having a battery-powered motorized window treatment 110 mounted in an opening 102, for example, in front of a window 104. The battery-powered motorized window treatment 110 may comprise a covering material, for example, a cellular shade fabric 112 as shown in FIG. 1. The cellular shade fabric 112 may have a top end connected to a headrail 114 and a bottom end connected to a weighting element 116. The headrail 114 may extend between opposite ends that are connected to mounting brackets 180 (FIG. 2A). The mounting brackets 180 may be mounted to the bottom of a top side of the opening 102 as shown in FIG. 1, such that the cellular shade fabric 112 is able to hang in front of the window 104, and may be adjusted between a fully-open position $P_{FULLY-OPEN}$ and a fully-closed position $P_{FULLY-CLOSED}$ to control the amount of daylight entering a room or space. Alternatively, the mounting brackets 180 of the motorized window treatment 110 could be mounted externally to the opening 102 (e.g., above the opening) with the shade fabric 112 hanging in front of the opening and the window 104. In addition, the battery-powered motorized window treatment 110 could alternatively comprise other types of covering materials, such as, for example, a plurality of horizontally-extending slats (i.e., a Venetian or Persian blind system), pleated blinds, a roller shade fabric, or a Roman shade fabric.

The motorized window treatment system 100 may comprise a radio-frequency (RF) remote control 190 for transmitting RF signals 106 to the motorized window treatment 110 using, for example, a frequency-shift keying (FSK) modulation technique, to thus control the operation of the motorized window treatment. The RF remote control 190 may be configured to transmit digital messages including commands to control the motorized window treatment 110 in response to actuations of a plurality of buttons, e.g., an open button 192, a close button 194, a raise button 195, a lower button 196, and a preset button 198. The motorized window treatment 110 may control the cellular shade fabric 112 to the fully-open position $P_{FULLY-OPEN}$ and the fully-closed position $P_{FULLY-CLOSED}$ in response to actuations of the open button 192 and the close button 194 of the remote control 190, respectively. The motorized window treatment 110 may raise and lower the cellular shade fabric 112 in response to actuations of the raise button 195 and the lower button 196, respectively. The motorized window treatment 110 may control the cellular shade fabric 112 to a preset position $P_{PRESET}$ in response to actuations of the preset button 198.

The motorized window treatment system 100 may also comprise an infrared (IR) remote control (not shown) for controlling the operation of the motorized window treatment 110. An example of a motorized window treatment system having an IR remote control is described in greater detail in commonly-assigned U.S. Patent Application Publication No. 2012/0261078, published Oct. 18, 2012, entitled MOTORIZED WINDOW TREATMENT, the entire disclosure of which is hereby incorporated by reference.

FIG. 2A is a perspective view and FIG. 2B is a right side view of the battery-powered motorized window treatment 110 with the cellular shade fabric 112 in the fully-open position $P_{FULLY-OPEN}$. FIG. 3A is a perspective view and FIG. 3B is a right side view of the motorized window treatment 110 when the motorized window treatment is in a service position in which a user may easily access batteries 170 of the motorized window treatment (as will be described in greater detail below). The motorized window treatment 110 may comprise a motor drive unit 120 for raising and lowering the weighting element 116 and the cellular shade fabric 112 between the fully-open position $P_{FULLY-OPEN}$ and the fully-closed position $P_{FULLY-CLOSED}$. By controlling the amount of the window 104 covered by the cellular shade fabric 112, the motorized window treatment 110 may control the amount of daylight entering the room. The headrail 114 of the motorized window treatment 110 may comprise an internal side 122 and an opposite external side 124, which faces the window 104 that the shade fabric 112 is covering.

The motor drive unit 120 may comprise an actuator 126, which is positioned adjacent the internal side 122 of the headrail 114 may be actuated when a user is configuring the motorized window treatment 110. The actuator 126 may be made of, for example, a clear material, such that the actuator may operate as a light pipe to conduct illumination from inside the motor drive unit 120 to thus be provide feedback to the user of the motorized window treatment 110. The motor drive unit 120 may be configured to determine a target position $P_{TARGET}$ for the weighting element 116 in response to commands included in the RF signals 106 received from the remote control 190 and to subsequently control a present position $P_{PRES}$ of the weighting element to the target position $P_{TARGET}$. As shown in FIGS. 2A and 3A, a top side 128 of the headrail 114 may be open, such that the motor drive unit 120 may be positioned inside the headrail and the actuator 126 may protrude slightly over the internal side 122 of the headrail.

Figure 4:
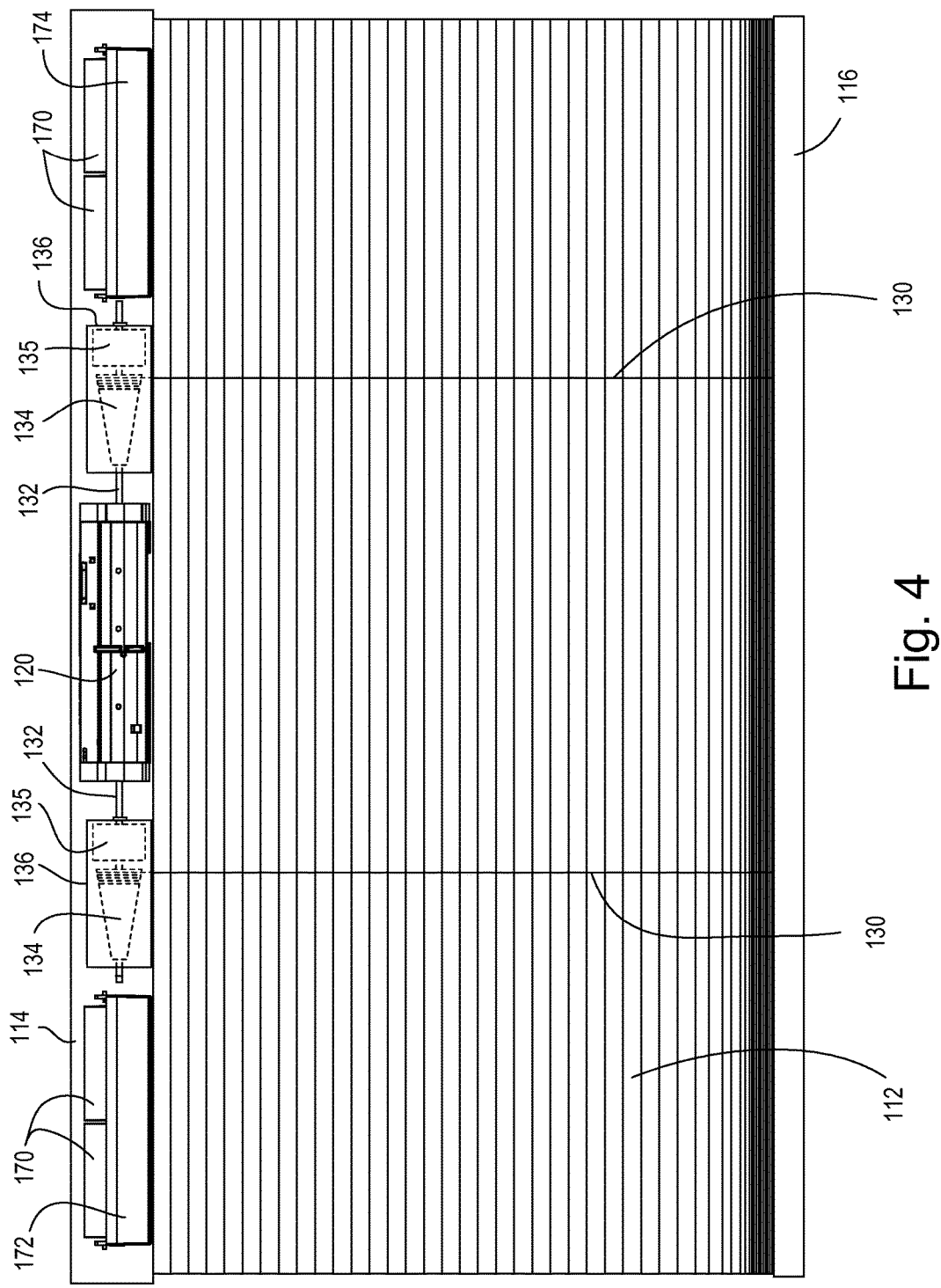
FIG. 4 is a front view of the battery-powered motorized window treatment of FIG. 1.

FIG. 4 is a front view of the battery-powered motorized window treatment 110 with a front portion of the headrail 114 removed to show the motor drive unit 120, which may be located in the center of the headrail. The motorized window treatment 110 may comprise a drive assembly including two lift cords 130, two respective drive shafts 132, and two respective lift cord spools 134. The lift cords 130 may extend from the headrail 114 to the weighting element 116. The drive shafts 132 may extend from the motor drive unit 120 on each side of the motor drive unit and may each be coupled to the respective lift cord spool 134. The lift cords 130 may be windingly received around the lift cord spools 134 and are fixedly attached to the weighting element 116. The motor drive unit 120 may include an internal motor 140 (FIG. 5) coupled to the drive shafts 132 to allow the motor drive unit 120 to rotate the drive shafts to wind and unwind the lift cords 134 and thus raise and lower the weighting element 116.

The drive assembly of the motorized window treatment 110 may further comprise two constant-force spring assist assemblies 135, which may each be coupled to the drive shafts 132 adjacent to one of the two lift cord spools 134. Each of the lift cord spools 134 and the adjacent constant-force spring assist assembly 135 may be housed in a respective lift cord spool enclosure 136 as shown in FIG. 4. Alternatively, the motorized window treatment 110 could comprise a single drive shaft that extends along the length of the headrail and is coupled to both of the lift cord spools 134 and the motor drive unit 120 could be located in the center of the headrail 114 in the space between the drive shaft and either the internal side 122 or the external side 124 of the headrail. Further, the motorized window treatment 110 could comprise a single drive and the motor drive unit 120 could alternatively be located at either end of the headrail 114.

Figure 5:
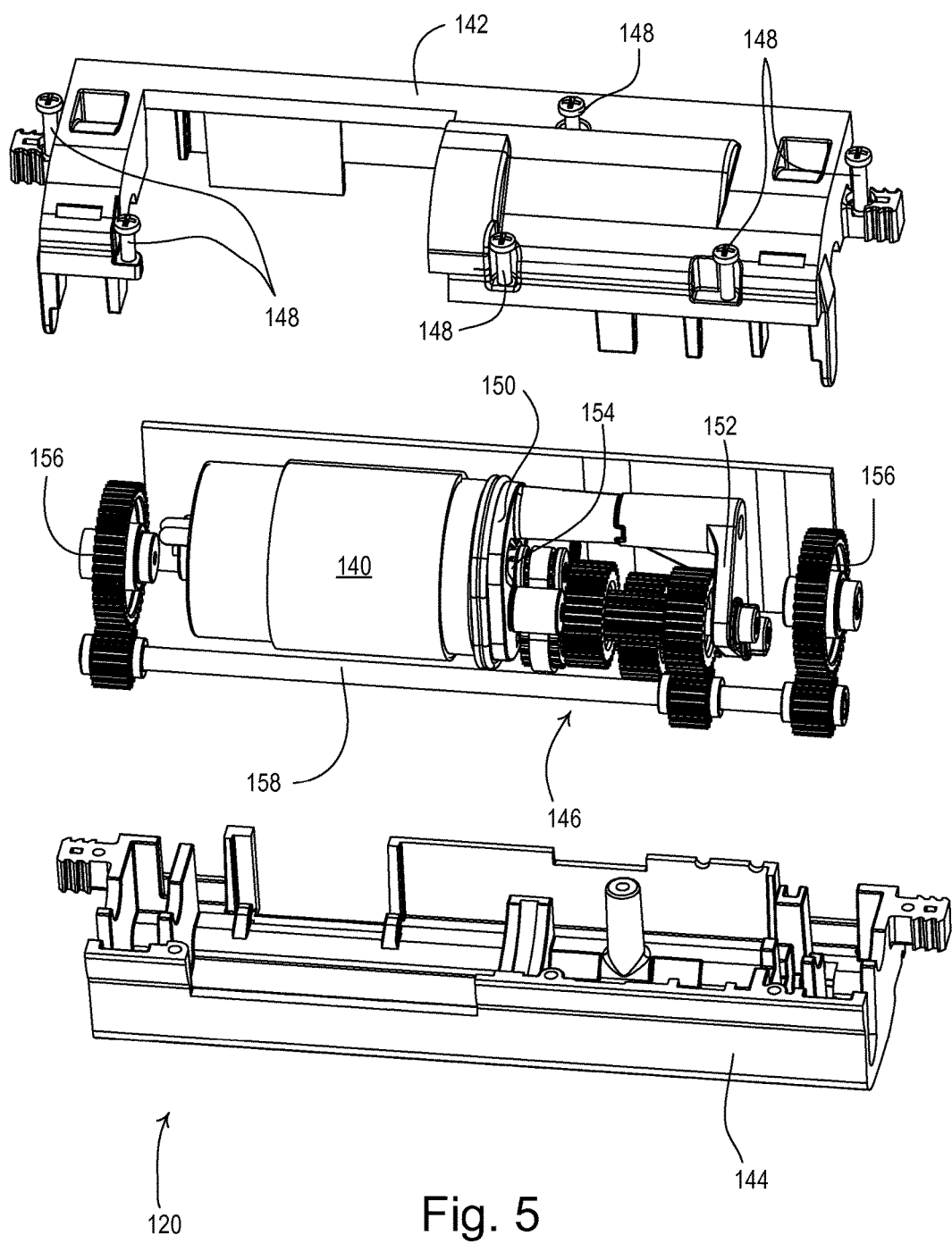
FIG. 5 is an exploded view of a motor drive unit of the battery-powered motorized window treatment of FIG. 1.

FIG. 5 is an exploded view of the motor drive unit 120. The motor drive unit 120 may comprise two enclosure portions 142, 144 for housing the motor 140 and a gear assembly 146. The two enclosure portions 142, 144 may be connected and held together by a plurality of screws 148. The gear assembly 146 may be held together by two end portions 150, 152 and driven by an output shaft 154 of the motor 140. The motor drive unit 120 may comprise output gears 156 that may be located on both sides of the motor drive unit and are coupled to the drive shafts 132. The gear assembly 146 may be coupled to the output gears 156 via a coupling member 158, such that the rotations of the output shaft of the motor 140 may result in rotations of the drifts shafts 132.

The batteries 170 of the motorized window treatment 110 may be arranged in two separate battery packs 172, 174 (e.g., battery compartments or battery holders) as shown in FIG. 4. Each battery pack 172, 174 may comprise two batteries 170 (e.g., two D-cell batteries) as shown in FIG. 4. The batteries 170 of each battery pack 172, 174 may be electrically coupled in series. In addition, the batteries 170 of the first battery pack 172 may be electrically coupled in series with the batteries 170 of the second battery pack 174 for powering the motor drive unit (as will be described in greater detail below with reference to FIG. 15). As described herein, the batteries 170 may provide the motorized window treatment 110 with a practical lifetime (e.g., approximately three years), and may typical "off-the-shelf" batteries that are easy and not expensive to replace. Alternatively, the motorized window treatment 110 could comprise a different number of batteries (e.g., six or eight) coupled in series and/or batteries of a different kind (e.g., AA batteries) coupled in series.

To increase the size of the cellular shade fabric 112 of the motorized window treatment 110, the motor drive unit 120 may need to be powered by more than four batteries. The headrail 114 of the motorized window treatment 110 may be lengthened to support the larger cellular shade fabric 112 and thus may accommodate additional batteries on each side of the motor drive unit 120. For example, each battery pack 172, 174 may comprise four batteries 170 (e.g., four D-cell batteries). In this case, the batteries 170 of the first battery pack 172 may be electrically coupled in parallel with the batteries 170 of the second battery pack 174 (as will be described in greater detail below with reference to FIG. 15).

The battery packs 172, 174 may be housed inside the headrail 114 and thus out of view of a user of the motorized window treatment 110. Since the motor drive unit 120 may be located in the center of the headrail 114 and the drive shafts 132 may extend out of both sides of the motor drive unit to the lift cord spools 134, there may be plenty of the room for the battery packs 172, 174 to be located adjacent the opposite sides of the headrail as shown in FIG. 4.

As previously mentioned, the motorized window treatment 110 may be adjusted to a service position as shown in FIGS. 3A and 3B to provide for easy access to the batteries 170 to allow the user to change the batteries when needed. During normal operation, the headrail 114 of the motorized window treatment 110 may be held in a locked position (as shown in FIGS. 2A and 2B). The mounting brackets 180 of the motorized window treatment 110 may be rotated to adjust the headrail 114 into the service position. Each mounting bracket 180 of the motorized window treatment 110 may comprise a release button 182, which may be actuated (e.g., pushed) to release the headrail 114 from the locked position, such that the headrail may be rotated into the service position and the batteries 170 may be accessed as shown in FIGS. 3A and 3B. The release buttons 182 may be located above the headrail 114 and may protrude slightly over the internal side 122 of the headrail, such that the buttons are partially hidden from view when the motorized window treatment 110 is installed. The release buttons 182 may be labeled with appropriate text (such as "push") to inform the user of the required action to release the motorized window treatment 110 from the locked position. Examples of motorized window treatments that may be adjusted into service position to access batteries are described in greater detail in commonly-assigned U.S. Patent Application Publication No. 2013/0153162, published Jun. 20, 2013, entitled BATTERY-POWERED MOTORIZED WINDOW TREATMENT HAVING A SERVICE POSITION, the entire disclosure of which is hereby incorporated by reference.

The headrail 114 may be rotated into the service position independent of the position of the cellular shade fabric 112 between the fully-open position $P_{FULLY-OPEN}$ and the fully-closed position $P_{FULLY-CLOSED}$. The headrail 114 may be flexible enough, such that the buttons 182 of the mounting brackets 1670 may be actuated one at a time in order to release the headrail from the locked position. Accordingly, no tools may be required to release the motorized window treatment 110 from the locked position to enter the service position. Alternatively, the release buttons 182 may be implemented as pull-tabs or the motorized window treatment 110 could comprise latches that require tools to be unlatched. To accommodate larger cellular shade fabrics and longer headrails, additional mounting brackets 180 may be provided along the length of the headrail 114 (i.e., the mounting brackets provide a scalable solution).

Figure 6A:
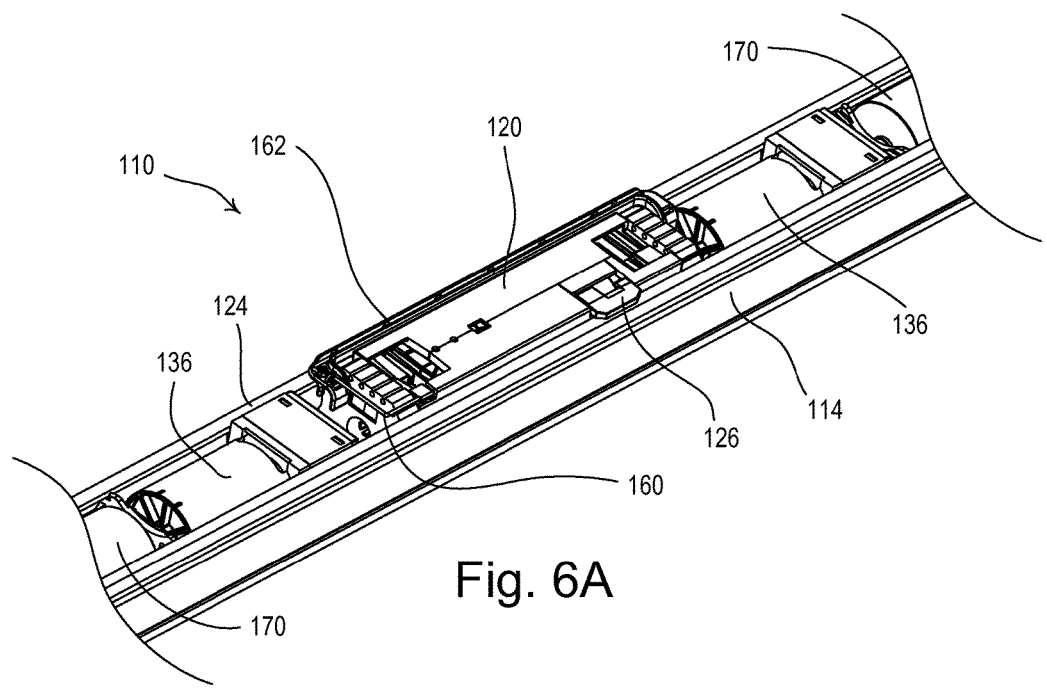
FIGS. 6A and 6B are partial perspective views of the motor drive unit and a headrail of the motorized window treatment of FIG. 1.
Figure 6B:
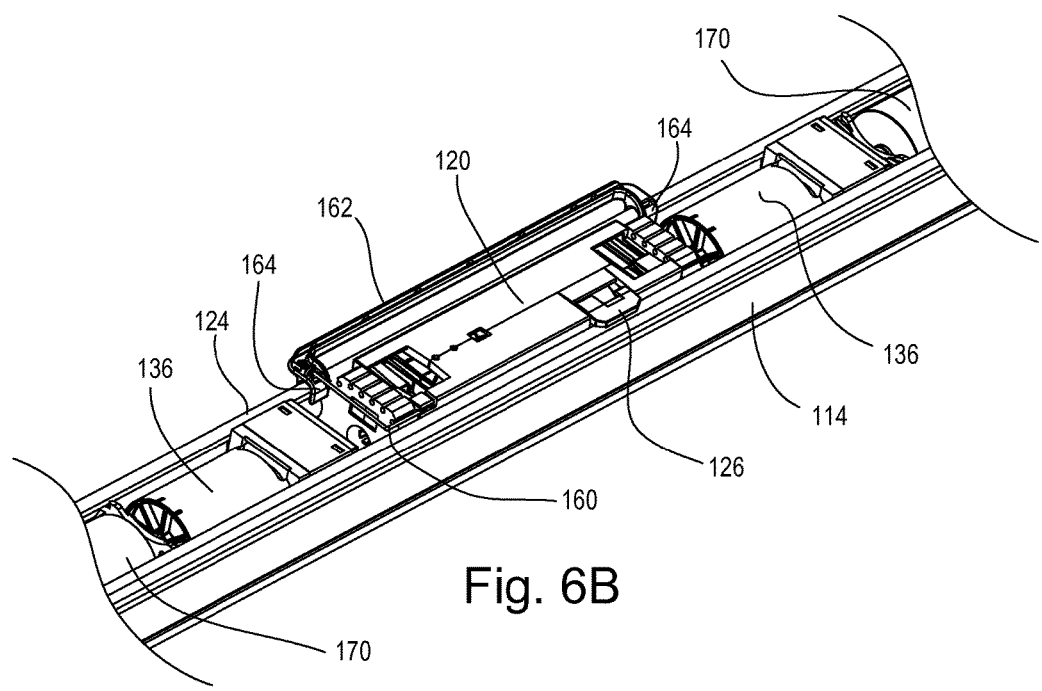

FIGS. 6A and 6B are partial perspective views of the motor drive unit 120 and the headrail 114 of the motorized window treatment 110. The motor drive unit 120 may comprise an antenna 160 (e.g., a wire antenna) that may be coupled to an RF receiver inside of the motor drive unit for receiving the RF signals 106. The antenna 160 may be configured to extend from the motor drive unit 120 and may be received in an elongated antenna wire carrier 162. As shown in FIG. 6A, the antenna wire carrier 162 may be located in a first position immediately adjacent the motor drive unit 120 above the external side 124 of the headrail 114. The antenna wire carrier 162 may be removed from the first position and re-located into a second position in which the antenna 160 is slightly offset (e.g., by a distance of approximately 0.4 inch) from the motor drive unit 120 as shown in FIG. 6B. The antenna wire carrier 162 may comprise clips 164 that are adapted to snap onto the top edge of the external side 124 of the headrail 114 in the second position. The antenna wire carrier 162 may provide a mechanical means for adjusting the RF sensitivity of the RF receiver and thus the power consumed by the RF receiver. When the antenna wire carrier 162 is located in the second position (as shown in FIG. 6B), the RF receiver may have an increased RF sensitivity (e.g., by approximately 3 dB), and may thus be operable to receive more RF signals 106 than if the antenna wire carrier was located in the first position (as shown in FIG. 6A). However, the increased RF sensitivity may mean that the RF receiver may consume more power. Therefore, the antenna wire carrier 162 may be moved to the first position in which the RF receiver may have a reduced RF sensitivity, but consume less power.

The antenna 160 could also be located inside of the enclosure portions 142, 144 of the motor drive unit 120 (e.g., in a similar position as the first position shown in FIG. 6A). For example, if the headrail 114 is made of metal (such as aluminum) and the antenna 160 is located inside of the motor drive unit 120, the headrail may comprise openings (not shown), e.g., in the internal side 122, to provide metal-free area to allow for transmission of the RF signals 106 through the headrail.

The motorized window treatment 110 may be easily associated with the remote control 190, such that the motorized window treatment may be responsive to actuations of the buttons 192-198 of the remote control 190. First, the user may associate the remote control 190 with the motorized window treatment 110 by actuating the actuator 126 on the motor drive unit 120 and then pressing and holding, for example, the close button 194 on the remote control 190 for a predetermined amount of time (e.g., approximately five seconds). After the remote control 190 is associated with the motorized window treatment 110, the motorized window treatment may be responsive to the RF signals transmitted by the remote control. The user may program the preset position $P_{PRESET}$ of the motorized window treatment 110 by actuating the raise and lower buttons 195, 196 of the remote control 190 to adjust the position of the weighting element 116 to the desired preset position, and then pressing and holding the preset button 198 for the predetermined amount of time.

The user may also use the remote control 190 to program the upper and lower limits (e.g., the fully-open position $P_{FULLY-OPEN}$ and the fully-closed position $P_{FULLY-CLOSED}$) of the motorized window treatment 110. To enter a limit programming mode, the user may actuate the actuator 126 on the motor drive unit 120, and then simultaneously press and hold the open button 192 and the raise button 195 of the remote control 190 for the predetermined amount of time (e.g., approximately five seconds). To program the lower limit, the user may actuate the raise and lower buttons 195, 196 of the remote control 190 to adjust the position of the weighting element 116 to the desired fully-closed position $P_{FULLY-CLOSED}$, and then press the close button 194 for the predetermined amount of time. To program the upper limit, the user may actuate the raise and lower buttons 195, 196 of the remote control to adjust the position of the weighting element 116 to the desired fully-open position $P_{FULLY-OPEN}$, and then press the open button 195 for the predetermined amount of time. The user may then press and hold the open button 192 and the raise button 195 of the remote control 190 for the predetermined amount of time to exit the limit programming mode.

As shown in FIG. 4, the spring assist assemblies 135 may be coupled to the drive shafts 132 with one of the spring assist assemblies housed in each of the lift cord spool enclosures 136 as shown in FIG. 4. Each spring assist assembly 135 may include a constant-force spring (not shown) having a first end attached to the respective lift cord spool enclosure 136 (which is fixedly attached to the head rail 114) and a second end attached to the respective drive shaft 132. The spring assist assemblies 135 may operate to provide a constant torque (e.g., approximately 0.44 Newtons) on the drive shafts 132 in the direction opposite the direction of the torque provided on the drive shafts by the lift cords 130. For example, the constant amount of torque provided by the spring assist assemblies 135 may be approximately equal to the torque provided on the drive shafts 132 by the lift cords 130 when the weighting element 116 is positioned half-way between the fully-open position $P_{FULLY-OPEN}$ and the fully-closed position $P_{FULLY-CLOSED}$ (i.e., due to the weight of the weighting element 116 and half of the cellular shade fabric 112). When wider cellular shade fabrics are used, additional lift cord spool enclosures 136

(each having a lift cord spool 134 and a spring assist assembly 135) may be coupled to the drive shafts 132 along the length of the headrail 114.

Figure 7A:
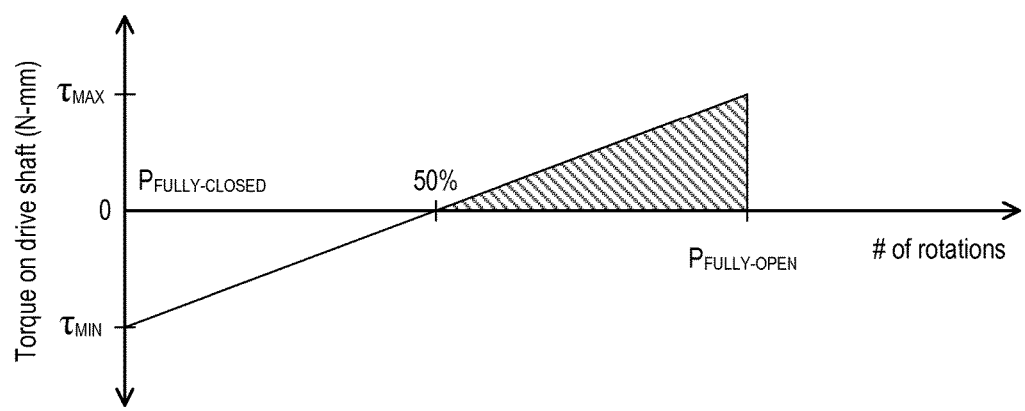
FIGS. 7A and 7B show example plots of the total torque on a drive shaft of the battery-powered motorized window treatment of FIG. 1 with respect to the number of rotations between a fully-closed position and a fully-open position.
Figure 7B:
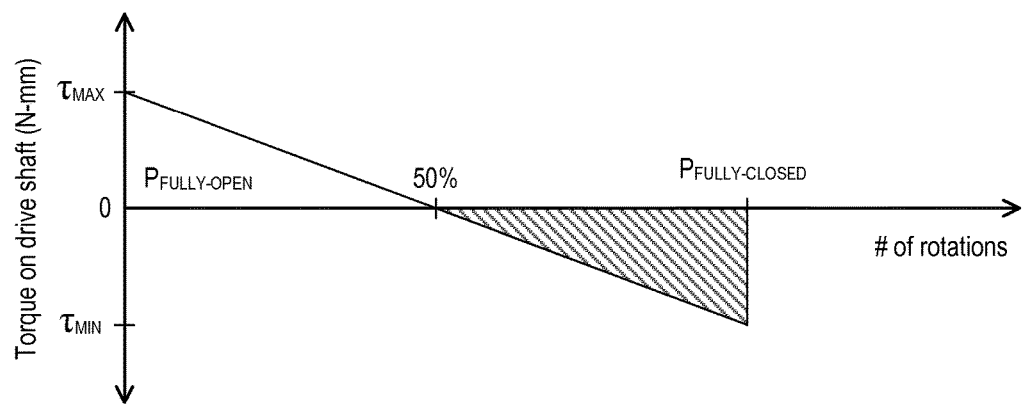

FIG. 7A is an example plot of the total torque on the drive shafts 132 with respect to the number of rotations between the fully-closed position $P_{FULLY\text{-}CLOSED}$ and the fully-open position $P_{FULLY\text{-}OPEN}$ while the motor drive unit 120 is raising the weighting element 116 from the fully-closed position $P_{FULLY\text{-}CLOSED}$ to the fully-open position $P_{FULLY\text{-}OPEN}$. FIG. 7B is an example plot of the total torque on the drive shafts 132 with respect to the number of rotations between the fully-closed position $P_{FULLY\text{-}CLOSED}$ and the fully-open position $P_{FULLY\text{-}OPEN}$ while the motor drive unit 120 is lowering the weighting element 116 from the fully-open position $P_{FULLY\text{-}OPEN}$ to the fully-closed position $P_{FULLY\text{-}CLOSED}$. For example, if the cellular shade fabric 112 weighs approximately 0.26 Newtons, the weighting element 116 weighs approximately 0.43 Newtons, and the cellular shade fabric 112 has a total height of approximately 1.35 meters, the torque on the drive shafts 132 may range from a minimum torque $\tau_{MIN}$ of approximately −1.68 N-mm to a maximum torque $\tau_{MAX}$ of approximately 1.80 N-mm.

With reference to FIG. 7A, when the weighting element 116 is in the fully-closed position $P_{FULLY\text{-}CLOSED}$, the least weight may be on the lift cords 130 that wrap around the drive shafts 132 and lift the cellular shade fabric 112 of the window treatment 110. The motor 140 of the motor drive unit 120 may comprise, for example, a permanent magnet motor that has a cogging torque due to the magnets that provides a resistance to movement. Further, the motor drive unit 120 may also include a gear box that provides substantial reduction of the motor speed. The combination of the motor cogging torque and the gear reduction may provide enough resistance on the drive shafts 132 to keep the cellular shade fabric 112 in any fixed position in front of the window 104 even when the total torque on the drive shafts is negative. This includes the fully-open position $P_{FULLY\text{-}OPEN}$ (when the weight is greatest and consequently highest torque is exerted by the lift cords 130) and the fully-closed position $P_{FULLY\text{-}CLOSED}$ (when the weight is least and the torque exerted by the lift cords is the lowest). Alternatively, a mechanically or electrically actuated brake could be used. However, appropriate considerations should be given to the power consumption when using a brake.

When the weighting element 116 is in the fully-open position $P_{FULLY\text{-}OPEN}$, the spring assist assemblies 135 may provide a constant torque to raise the cellular shade fabric 112, opposed by the increasing torque provided by the weight of the cellular shade fabric as the weighting element 116 pushes against the cellular shade fabric that piles up on the weighting element 116. At a point approximately at the position at the middle of the fully-open position $P_{FULLY\text{-}OPEN}$ and the fully-closed position $P_{FULLY\text{-}CLOSED}$, the torque provided by the spring assist assembly 135 may balance the torque provided by the lift cords 130 which is shown at the 50% position in FIG. 7A. During this period, the motor 140 may be pulsed with a constant duty cycle and conduct only a small amount of current to ensure movement. Above the 50% position, the motor 140 may conduct a greater amount of current and provide torque on the drive shafts 132 to raise the weighting element 116 to the fully-open position $P_{FULLY\text{-}OPEN}$. The motor cogging torque and gear reduction may maintain the cellular shade fabric 112 of the window treatment 110 in the fully-open position $P_{FULLY\text{-}OPEN}$ against the weight of the fully-opened window treatment. The cellular shade fabric 112 of the window treatment 100 can of course be stopped at any position between the fully-open position $P_{FULLY\text{-}OPEN}$ and fully-closed position $P_{FULLY\text{-}CLOSED}$.

FIG. 7B shows the total torque on the drive shafts 132 when the motorized window treatment 110 in the process of being closed. Since maximum weight is on the lift cords 130 when the weighting element 116 is in the fully-open position $P_{FULLY\text{-}OPEN}$, the cellular shade fabric 112 and the weighting element may begin to fall of their own weights when the motor 140 is provided with an initial small pulse. The motor 140 may be pulsed with a constant duty cycle during this period. At the midway position between the fully-open position $P_{FULLY\text{-}OPEN}$ and fully-closed position $P_{FULLY\text{-}CLOSED}$, the torque provided by the lift cords due to the weight of the cellular shade fabric 112 and the weighting element 116 may counter balance the opposing force of the spring assist assemblies 135. At the midway position, the weight may no longer be adequate to oppose the spring assist assemblies 135 and the motor 140 drives the weighting element 116 of the window treatment 110 to the fully-closed position $P_{FULLY\text{-}CLOSED}$ against the torque provided by the spring assist assemblies 135 to wind up the lift cords 130. The springs of the spring assist assemblies 135 may thus be wound up to assist in later raising of the cellular shade fabric 112 of the window treatment 110.

In FIGS. 7A and 7B, the shaded regions may represent the regions where energy is provided by the motor 140 to the system. The spring assist assemblies 135 may thus provide for optimizing battery life by reducing the time that the motor 140 needs to be energized to raise and/or lower the cellular shade fabric 112 of the window treatment 110.

Alternatively, each spring assist assembly 135 could include a negative-gradient spring (not shown) coupled between the respective lift cord spool enclosure 136 and the respective drive shaft 132. Each negative-gradient spring may provide a varying torque on the respective drive shaft 132 depending upon the position of the cellular shade fabric 112, for example, to provide more torque when the cellular shade fabric 112 is close to or at the fully-open position $P_{FULLY\text{-}OPEN}$ than when the cellular shade fabric is close to or at the fully-closed position $P_{FULLY\text{-}CLOSED}$. Similar to torque plots for the constant-force spring as shown in FIGS. 8A and 8B, the torque provided by the negative-gradient springs may balance the torque provided by the lift cords 130 at a point approximately at the position at the middle of the fully-open position $P_{FULLY\text{-}OPEN}$ and the fully-closed position $P_{FULLY\text{-}CLOSED}$ (i.e., 50%). However, the shaded regions where energy is provided by the motor 140 to the system may be smaller when negative-gradient springs are used.

Figure 8:
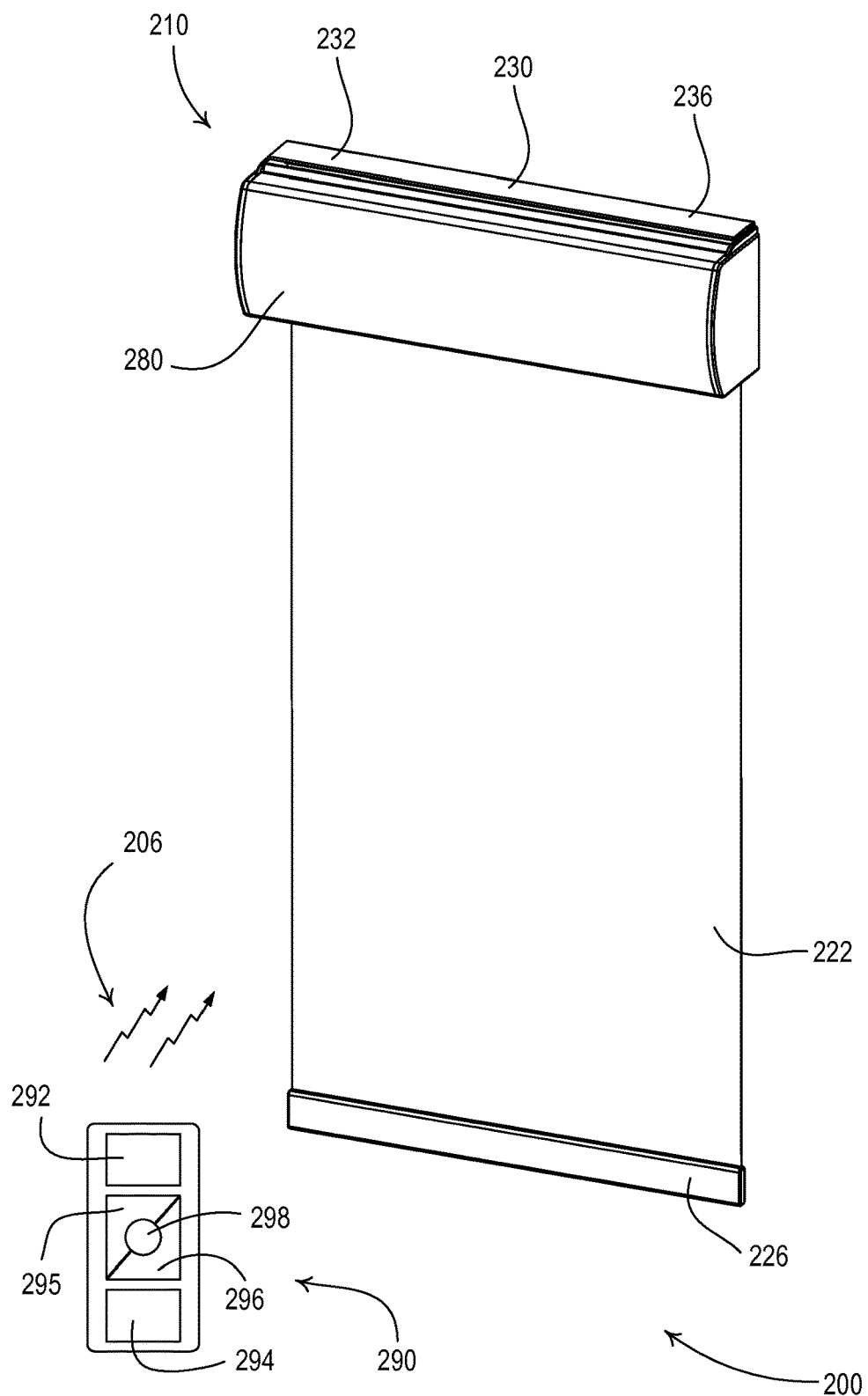
FIG. 8 is a perspective view of a motorized window treatment system having a battery-powered roller shade and a remote control.
Figure 9A:
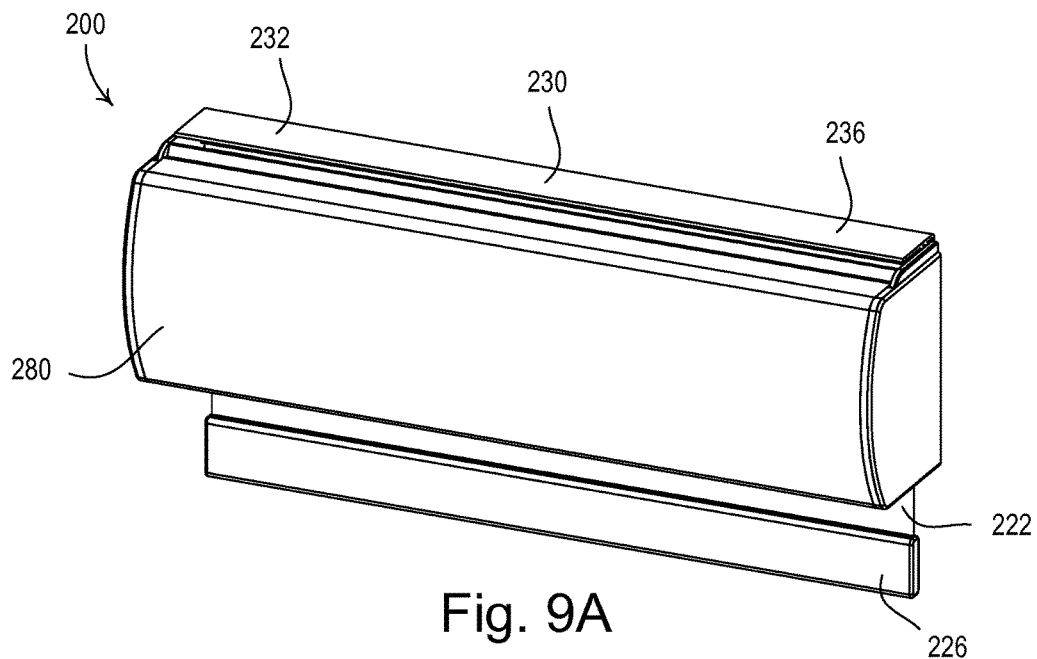
FIG. 9A is a perspective view of the motorized roller shade of FIG. 8 in a raised position with a battery compartment and a fascia in a closed position.

FIG. 8 is a perspective view of a motorized window treatment system 200 having a battery-powered motorized roller shade 210 that may be mounted in front of an opening, such as one or more windows, to prevent daylight from entering a space and/or to provide privacy. The motorized roller shade 210 may be mounted to a structure that is proximate to the opening, such as a window frame, a wall, or other structure. The motorized roller shade 210 may comprise a covering material (e.g., a shade fabric 222) and a hembar 226, which may be adjusted between a lowered position (as shown in FIG. 8) and a raised position (as shown in FIG. 9A). The shade fabric 222 may hang in front of the opening, and may be adjusted between a fully-open position $P_{FULLY\text{-}OPEN}$ and a fully-closed position $P_{FULLY\text{-}CLOSED}$, for example, to control the amount of daylight entering the space. The shade fabric 222 may be made of any suitable material, or combination of materials. For example, the shade fabric 222 may be made from one or more of "scrim," woven cloth, non-woven material, light-control film, screen, or mesh. The hembar 226 may be attached to a lower end of the shade fabric 222, and may be weighted, such that the hembar 226 causes the shade fabric 222 to hang (e.g., vertically) in front of the opening.

The motorized window treatment system 200 may comprise an RF remote control 290 for transmitting RF signals 206 to the motorized roller shade 210 to control the operation of the motorized roller shade. The RF remote control 290 may be configured to transmit digital messages including commands to control the motorized roller shade 210 in response to actuations of a plurality of buttons, e.g., an open button 292, a close button 294, a raise button 295, a lower button 296, and a preset button 298. The motorized roller shade 210 may control the shade fabric 222 to the fully-open position $P_{FULLY-OPEN}$ and the fully-closed position $P_{FULLY-CLOSED}$ in response to actuations of the open button 292 and the close button 294 of the remote control 290, respectively. The motorized roller shade 210 may raise and lower the shade fabric 222 in response to actuations of the raise button 295 and the lower button 296, respectively. The motorized roller shade 210 may control the shade fabric 222 to a preset position $P_{PRESET}$ in response to actuations of the preset button 298. The motorized window treatment system 200 may also comprise an IR remote control (not shown) for controlling the operation of the motorized roller shade 210.

Figure 9B:
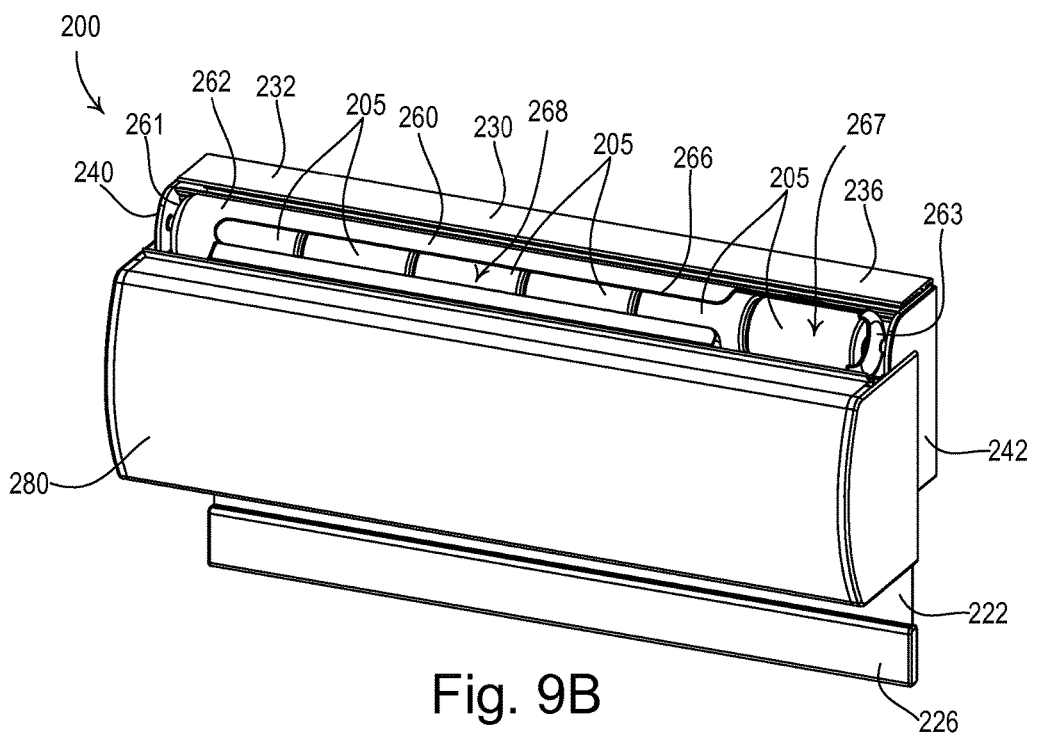
FIG. 9B is a perspective view of the motorized roller shade of FIG. 8 in the raised position with the battery compartment and the fascia in an opened position.

The motorized roller shade 210 may include a housing 230, a battery compartment 260, and a fascia 280. FIG. 9A is a perspective view of the motorized roller shade 210 in the raised position with the battery compartment 260 and the fascia 280 in a closed position. FIG. 9B is a perspective view of the motorized roller shade 210 in the raised position with the battery compartment 260 and the fascia 280 in an opened position. The housing 230 may be configured as a mounting and/or support structure for the motorized roller shade 210, e.g., to support the battery compartment 260. The battery compartment 260 may be configured to retain one or more batteries 205 (e.g., D-cell batteries). The battery compartment 260 may be configured to be operable between the opened position and the closed position, such that one or more batteries 205 may be accessible when the battery compartment is in the opened position. The battery compartment 260 may be mechanically bistable with respect to the opened and closed positions.

Figure 10A:
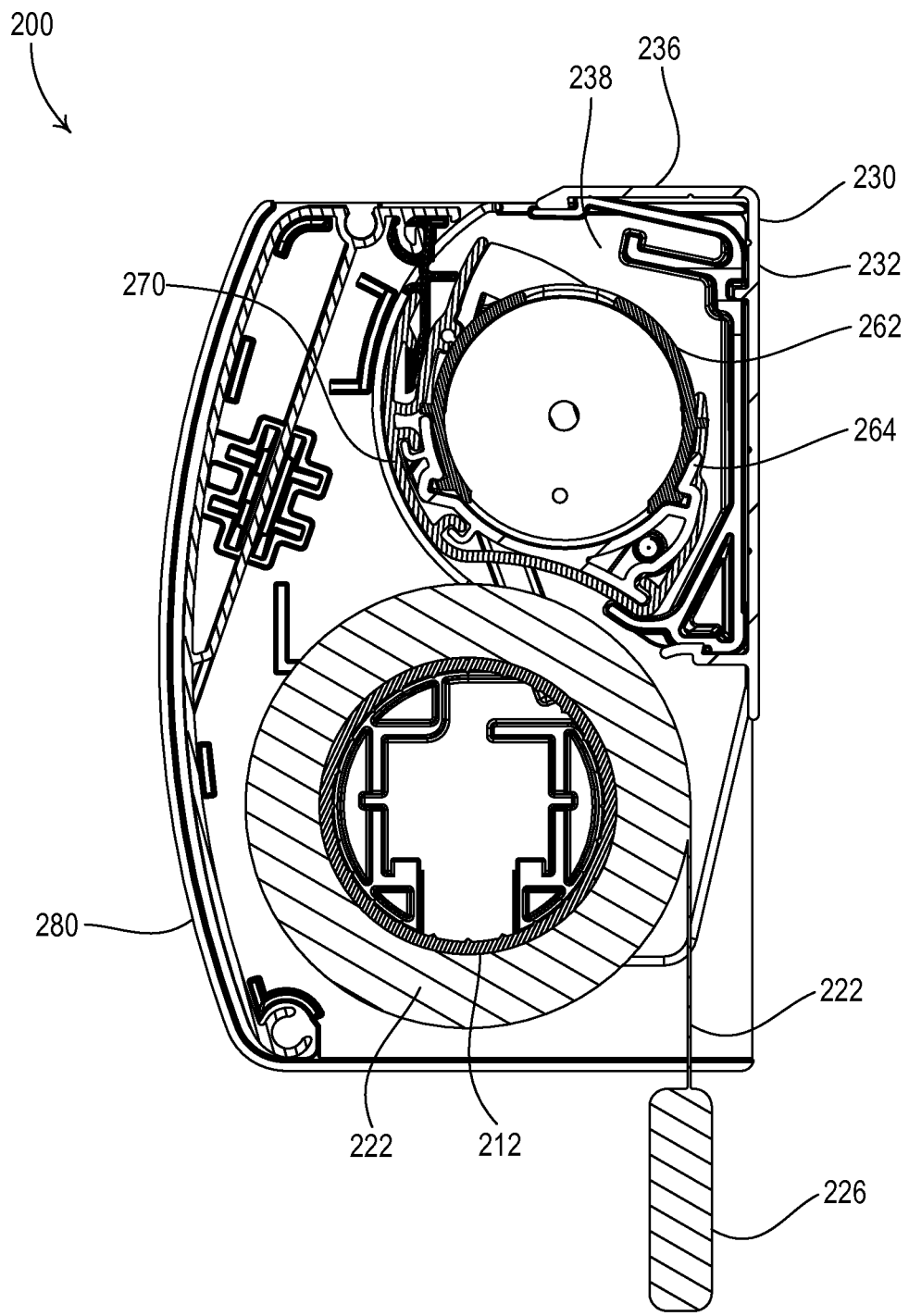
FIG. 10A is a side cross-sectional view of the motorized roller shade of FIG. 8 in the raised position with the battery compartment and the fascia in the closed position.
Figure 10B:
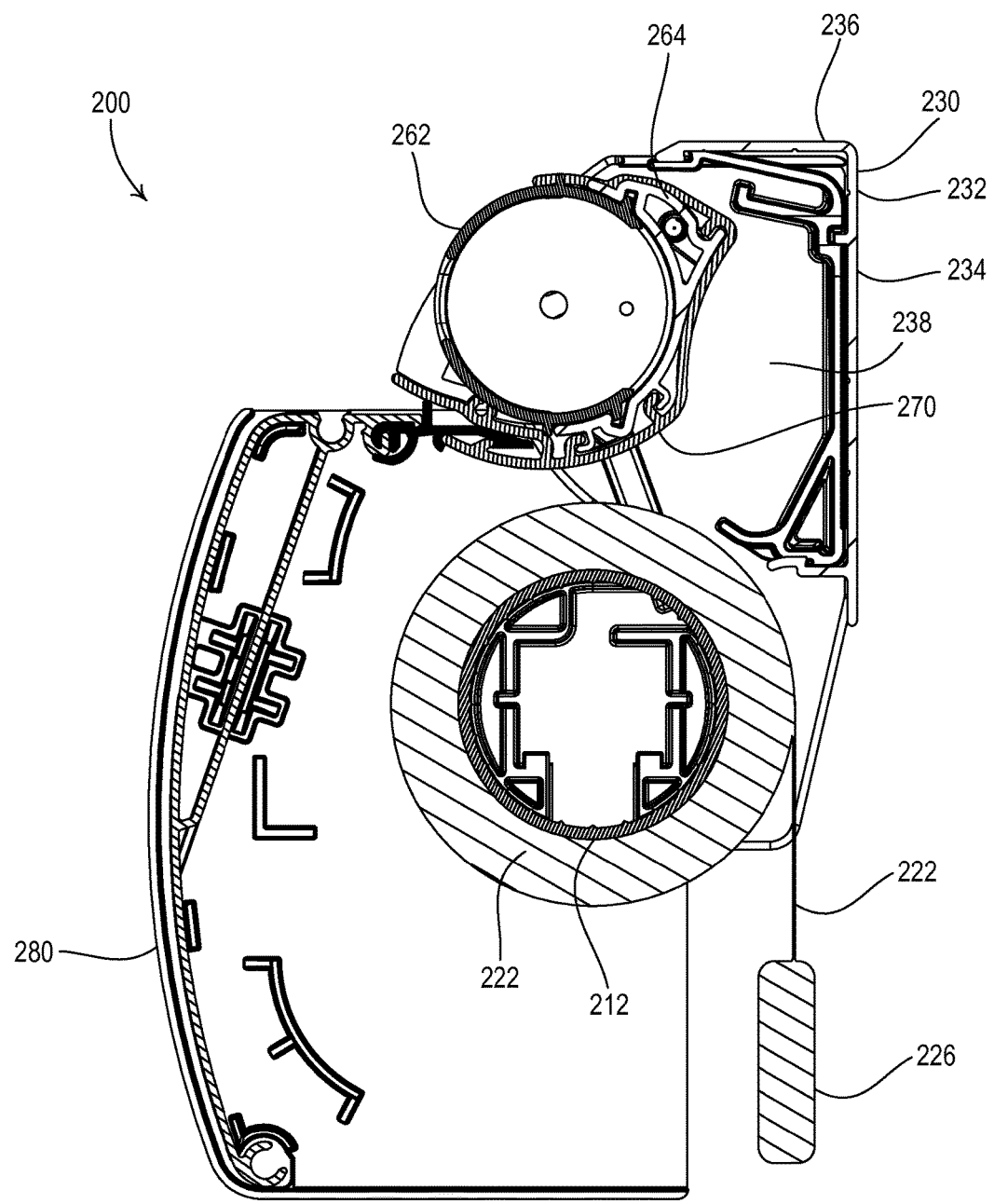
FIG. 10B is a side cross-sectional view of the motorized roller shade of FIG. 8 in the raised position with the battery compartment and the fascia in the open position.

FIG. 10A is a side cross-sectional view of the motorized roller shade 210 in the raised position with the battery compartment 260 and the fascia 280 in the closed position. FIG. 10B is a side cross-sectional view of the motorized roller shade 210 in the raised position with the battery compartment 260 and the fascia 280 in the opened position. The motorized roller shade 210 may comprise a drive assembly including a roller tube 212, which may define a cylindrical shape and may be hollow to at least partially receive a motor drive unit (not shown). The drive assembly may further comprise a coupler connected to a driven end of the motor drive unit. The motor drive unit may be operably coupled to the roller tube 212 when the motor drive unit is disposed in the roller tube 212, such that operation of the motor drive unit causes the roller tube 212 to rotate. The roller tube 212 may define a central, longitudinal axis, about which the roller tube 212 may rotate. Rotation of the roller tube 212 about the longitudinal axis, for example, rotation caused by the motor drive unit, may cause the shade fabric 222 to wind onto, or to unwind from, the roller tube 212. In this regard, the motor drive unit may adjust the covering material (e.g., the shade fabric 222), for instance between raised and lowered positions.

The motor drive unit may be configured to enable control of the rotation of the roller tube 212, for example, in response to actuations of the buttons 292-298 of the remote control 290 by a user of the motorized roller shade 210. Examples of motor drive units for motorized roller shades are described in greater detail in commonly-assigned U.S. Pat. No. 6,983,783, issued Jan. 10, 2006, entitled MOTORIZED SHADE CONTROL SYSTEM, and U.S. Pat. No. 7,839,109, issued Nov. 23, 2010, entitled METHOD OF CONTROLLING A MOTORIZED WINDOW TREATMENT, the entire disclosures of which are incorporated by reference herein. It should be appreciated, however, that any motor drive unit or drive system may be used to control the roller tube 212.

The motorized roller shade 210 may include an antenna (not shown) that is configured to receive wireless signals (e.g., RF signals from a remote control device). The antenna may be in electrical communication with a wireless communication circuit (e.g., an RF transceiver) in the motor drive unit (e.g., via a control circuit or PCB), such that one or more wireless signals received from a remote control unit may cause the motor drive unit to move the shade fabric 222 (e.g., between the lowered and raised positions). The antenna may be integrated with (e.g., pass through, be enclosed within, and/or be mounted to) one or more of the roller tube 212, the housing 230, the battery compartment 260, or respective components thereof.

As shown, the housing 230 may include a rail 232, a first housing bracket 240, and a second housing bracket 242, which may be configured to attach to one another in an assembled configuration. The rail 232, the first housing bracket 240, and the second housing bracket 242, when in the assembled configuration, may define a cavity 238 (e.g., as shown in FIGS. 10A and 10B). The roller tube 212 and the battery compartment 260 may be disposed in the cavity 238, for example when the motorized roller shade 210 is in the assembled configuration.

The housing 230 may be configured to support one or both of the roller tube 212 and the battery compartment 260. For example, the first and second housing brackets 240, 242 may be configured to support the roller tube 212 and/or the battery compartment 260. As shown, the first and second housing brackets 240, 242 are configured to support the roller tube 212 and the battery compartment 260 such that the battery compartment 260 is located (e.g., is oriented) above the roller tube 212 when the battery-powered roller shade 210 is mounted to a structure. The battery compartment 260 may be pivotable (e.g., rotatable) about posts on the first and second housing brackets 240, 242 between the closed position and the opened position. The first and second housing brackets 240, 242 may support the roller tube 212 such that when the motorized roller shade 210 is in the assembled configuration and is mounted to a structure, the roller tube 212 does not move relative to the structure when the battery compartment 260 is operated between the opened and closed positions.

The battery compartment 260 may be configured to hold (e.g., to retain) one or more batteries 205. The battery compartment 260, when supported by the housing 230, may be operated between an opened position and a closed position, for example by causing the battery compartment to pivot about a pivot axis. When the battery compartment 260 is in the closed position, the one or more batteries 205 held by the battery compartment are concealed from view (e.g., as shown in FIG. 9A). When the battery compartment 260 is in the opened position, the one or more batteries 205 held by the battery compartment 260 may be at least partially visible (e.g., as shown in FIG. 9B), and are accessible, such that one or more batteries 205 may be removed from, or disposed into, the battery compartment. For example, when the battery compartment 260 is in the opened position, one or more batteries 205 may be removed from, or disposed into, the battery compartment along a direction that is perpendicular to the longitudinal axis of the roller tube 212. In this regard, one or more batteries 205 held by the battery compartment 260 are accessible along a direction that is perpendicular to the longitudinal axis when the battery compartment is in the opened position. In an example of mounting the motorized roller shade 210 to a structure, the motorized roller shade may be mounted internally with respect to the frame of a window (e.g., inside the window frame of the window), for example in accordance with an internal mount configuration. When the motorized roller shade 210 is mounted inside of a window frame, the batteries 205 may be accessible within an area defined by a periphery of the window frame. The battery compartment 260 may be operated between the opened and closed positions when the motorized roller shade 210 is in an assembled configuration and is mounted to a structure.

In accordance with the illustrated motorized roller shade 210, the battery compartment 260 may be operated between closed and opened positions, regardless of what position the shade fabric 222 is in relative to the roller tube 212. For example, the battery compartment 260 may be operated between the opened and closed position when the shade fabric 222 is in a lowered position, is in a raised position, or is in any intermediate position between the raised and lowered positions. Stated differently, the battery compartment 260 may be operated between the opened and closed positions independently of an amount of the shade fabric 222 that is lowered. Stated differently still, the battery compartment 260 may be operated between the opened and closed positions without adjusting the roller tube 212 (e.g., without causing the roller tube to rotate). Because the shade fabric 222 may remain in a static position while the battery compartment 260 is operated between the closed and opened positions, the motor drive unit may properly maintain tracking information of the position of the shade fabric 222 while one or more batteries 205 are removed from the battery compartment (e.g., while one or more batteries 205 are replaced).

When the illustrated battery compartment 260 is operated from the closed position to the opened position, the battery compartment 260 may pivot about the pivot axis, such that the battery compartment 260, and thus one or more batteries 205 retained by the battery compartment, moves away from (e.g., rotates away from) a plane defined by the shade fabric 222 (e.g., a plane defined by a portion of the shade fabric 222 that is unwound from the roller tube 212 and is hanging vertically). In this regard, when the battery compartment 260 is operated from the closed position to the opened position, the battery compartment 260 may move away from (e.g., rotate away from) a structure that the battery-powered roller shade 210 is mounted to (e.g., a window frame).

As shown, the battery compartment 260 includes a battery pack 262 (e.g., a battery holder), a support 264, and a cover 270. The battery pack 262 may be configured to hold (e.g., to retain) the batteries 205 for example in a linear (e.g., coaxial) arrangement within the battery compartment 260. The battery pack 262 may be in electrical communication with (e.g., electrically coupled to) one or more electrical components of the motorized roller shade 210, for instance the motor drive unit, such that the one or more batteries 205 may power the electrical components of the motor drive unit. As shown, the battery pack 262, and thus the battery compartment 260, may be configured to retain six (6) D cell (e.g., IEC R20) batteries electrically coupled in series, e.g., in a head to tail, linear (e.g., coaxial) arrangement in the battery pack. As described herein, the batteries 205 may provide the motorized roller shade 210 with a practical lifetime (e.g., approximately three years), and may typical "off-the-shelf" batteries that are easy and not expensive to replace. Alternatively, the motorized roller shade 210 could comprise a different number of batteries (e.g., four or eight) coupled in series and/or batteries of a different kind (e.g., AA batteries) coupled in series.

The battery pack 262 may have a length such that the batteries 205 are held in respective positions in the channel 266 when the battery pack 262 is filled with six batteries. The battery pack 262 may be elongate between a first end 261 and an opposed second end 263. For example, the battery pack 262 may include respective electrical contacts disposed at the first and second ends 261, 263. One or more of the electrical contacts may be configured to press the corresponding terminals of the batteries 205 against one another, for example to maintain electrical communication among the batteries.

The electrical contacts may be configured to abut corresponding terminals of a first battery 205 disposed at the first end 261, and of a last battery 205 disposed at the second end 263, so as to place the batteries 205 in electrical communication with one or more electrical components of the motor drive unit of the motorized roller shade 210. For example, corresponding wires may connect the electrical contacts to the motor drive unit. The wires may be integrated with (e.g., pass through, be enclosed within, and/or be mounted to) one or more of the roller tube 212, the housing 230, the battery compartment 260, or respective components thereof. For example, wires may be run from the electrical contacts, through the battery compartment 260 along the pivot axis, along a surface of the housing 230, into the roller tube 212, and to the motor drive unit.

The antenna of the battery-powered roller shade 210 may be arranged on the cover 270 and may be in electrical communication with a wireless communication circuit in the motor drive unit. For example, the antenna may comprise a monopole antenna (e.g., a wire). For example, the antenna may extend along a surface of the cover 270, along the pivot axis, into the roller tube 212, and to the motor drive unit.

The battery pack 262 may define any suitable shape, such as the illustrated cylindrical shape. The battery pack 262 may define a cavity that is sized to receive one or more batteries 205. For example, as shown, the battery pack 262 may define a cylindrical channel 266 that is configured to receive one or more batteries 205 in a linear (e.g., coaxial) arrangement between first and second ends of the battery pack. The channel 266 may define a diameter that is slightly larger than an outer diameter of one of the batteries 205, such that each of the batteries may move (e.g., slide) when disposed in the battery pack 262. The diameter of the channel 266 may be, for example, in the range of about 1.25 inches to about 1.38 inches, such as about 1.3 inches. The battery pack 262 may be made of any suitable material, such as plastic.

The battery pack 262 may define an opening through which a battery 205 may be removed from, or inserted into, the battery pack 262. For example, as shown, the battery pack 262 defines an access aperture 267 through which one of the batteries 205 may be removed from, or inserted into, the channel 266. Stated differently, the battery compartment 260 defines an access aperture 267 through which a battery 205 may be removed from, or inserted into, the battery compartment 260. When the battery compartment 260 is in the closed position, the access aperture 267 may be disposed in the cavity 238 and hidden from view (e.g., as shown in FIG. 6A). When the battery compartment 260 is in the opened position, the access aperture 267 may be external to the cavity 238 and accessible (e.g., as shown in FIG. 6B), such that one or more batteries 205 may be disposed into, or removed from, the battery compartment 260.

The access aperture 267 may be sized such that one of the batteries 205 may be freely inserted through the access aperture 267 and into the battery pack 262 (e.g., with little or no resistance). As shown, the access aperture 267 defines a length, along an axial direction between the first and second ends of the battery pack 262, that is slightly longer than a length of a battery 205 (e.g., as defined between the contacts of the battery 205), and defines a width that is slightly wider than an outer diameter of the battery 205. The illustrated access aperture 267 is located near the second end of the battery pack 262, and near the second end 263 of the battery compartment 260. It should be appreciated, however, that the access aperture 267 may be located elsewhere along the battery pack 262. When a battery 205 is disposed into the channel 266 of the battery pack 262, the battery 205 may be moved (e.g., slid) between the first and second ends of the battery pack 262. In this regard, the battery pack 262 may be configured for slidable movement of a battery 205 between the first and second ends. And more generally, the battery compartment 260 may be configured for slidable movement of a battery 205 between the first and second ends 261, 263.

The battery pack 262 may be configured to allow movement of one or more batteries 205 between the first and second ends of the battery pack 262 while the battery-powered roller shade 210 is in an assembled configuration. As shown, for example, the battery pack 262 defines a slot 268 that is open to the access aperture 267, and that extends along the battery pack 262 toward the first end of the battery pack, in the axial direction. Stated differently, the battery compartment 260 defines a slot 268 that is open to the access aperture 267, and that extends along the battery compartment 260 toward the first end 261, in the axial direction. It should be appreciated that the battery pack 262 is not limited to the illustrated configuration of the slot 268. The slot 268 may define a width (e.g., between opposed edges of the slot 268 along a direction that is perpendicular to the axial direction) that is narrower than the outer diameter of a battery 205, but wide enough to allow an operator of the battery-powered roller shade 210 to slide a battery along the channel 266 between the first and second ends 164, 165 (e.g., using a finger disposed in the slot 268). The width of the slot 268 may be, for example, in the range of about 0.5 inches to about 1.0 inches, such as about 0.75 inches.

With the battery compartment 260 in the opened position, one or more batteries 205 may be replaced (e.g., if the batteries 205 are drained). A first battery 205 that is disposed at the access aperture 267 may be removed from the channel 266 by lifting the first battery 205 out of the channel 266. At the access aperture 267, one battery 205 at a time may be removed from the battery compartment 260, and thus from the housing 230 of the battery-powered roller shade 210, without interfering with the housing 230, the roller tube 212, or the shade fabric 222. With the first battery 205 removed, a second battery 205 may be removed from the channel 266 by sliding the second battery 205 along the channel 266 toward the access aperture 267 (e.g., by using a finger disposed in the slot 268). When the second battery 205 reaches the access aperture 267, it may be removed from the channel 266 similarly to the first battery 205. This process may be repeated for one or more additional batteries 205 (e.g., all six batteries 205). When a desired number of batteries 205 have been removed from the channel 266, one or more fresh batteries 205 (e.g., replacement batteries) may be disposed into the channel 266 past the retention tabs 169 and slid into position in the battery pack 262 (e.g., using the slot 268). When the battery pack 262 is filled with batteries 205, the battery compartment 260 may be operated from the opened position to the closed position.

The battery compartment 260 may be easily operated between the closed and opened positions. For example, an individual may operate the battery compartment 260 between the opened and closed positions using a single hand. Additionally, one or more batteries 205 may be removed from, or inserted into, the battery compartment 260 using a single hand. Such one-handed operation of the battery compartment 260 may enable the individual to freely use their other hand while replacing one or more batteries 205, for instance to brace himself or herself on a ladder. An example of a motorized roller shade having a rotatable battery compartment is described in greater detail in commonly-assigned U.S. Patent Application Publication No. 2014/0305602, published Oct. 16, 2014, entitled INTEGRATED ACCESSIBLE BATTERY COMPARTMENT FOR MOTORIZED WINDOW TREATMENT, the entire disclosure of which is hereby incorporated by reference.

The fascia 280 may be configured to conceal one or more components of the battery-powered roller shade 210, for instance when the battery compartment 260 is in the closed position. For example, the fascia 280 may be configured to be at rest in a raised (e.g., closed) position when the battery compartment 260 is in the closed position (e.g., as shown in FIG. 10A). The raised position of the fascia 280 may be referred to as a conceal position of the fascia 280. When the fascia 280 is in the conceal position, the fascia 280 may conceal the roller tube 212, a portion of the shade fabric 222 that is wound onto the roller tube 212, the battery compartment 260, and one or more portions of the housing 230 when the battery compartment 260 is in the closed position. In this regard, the fascia 280 may be configured to at least partially conceal the cavity 238 when the battery compartment 260 is in the closed position.

The fascia 280 may be configured to move when with the battery compartment 260 is moved between the opened and closed positions, for instance such that the fascia 280 does not interfere with inserting batteries 205 into, or removing batteries 205 from, the battery compartment 260 when the battery compartment 260 is in the opened position. For example, the fascia 280 may be configured to move downward and away from the housing 230 as the battery compartment 260 is pivoted from the closed position to the opened position, such that the fascia 280 is at rest in a lowered (e.g., open) position when the battery compartment 260 is in the opened position (e.g., as shown in FIG. 10B). The lowered position of the fascia 280 may be referred to as an expose position of the fascia 280. As shown, when the fascia 280 is in the expose position, the fascia 280 may be positioned such that the fascia 280 does not interfere with access to the battery compartment 260. In this regard, it may be said that the fascia 280 does not cover the battery compartment 260 when the fascia 280 is in the expose position. As shown, when the fascia 280 is in the expose position, the fascia 280 may still conceal the roller tube 212, a portion of the shade fabric 222 (e.g., a portion of the shade fabric 222 that is wound onto the roller tube 212), and one or more portions of the housing 230.

The fascia 280 may be operably attached to the battery compartment 260, such that the fascia 280 moves along with the battery compartment 260 when the battery compartment 260 is moved between the opened and closed positions. For example, as shown, the fascia 280 may be pivotally supported by the battery compartment 260, such that the fascia 280 pivots from the conceal position to the expose position as the battery compartment is operated from the closed position to the opened position, and pivots from the exposed position to the conceal position as the battery compartment is operated from the opened position to the closed position.

To increase the size of the shade fabric 222 of the motorized roller shade 210, the motor drive unit may need to be powered by more than six batteries. The housing 230 of the motorized roller shade 210 may be lengthened to support the larger shade fabric 222. Accordingly the battery compartment 260 may also be lengthened and may accommodate additional battery packs and/or batteries. For example, the battery compartment 260 may comprise two battery packs, each having six batteries (e.g., six D-cell batteries). The batteries of the first battery pack may be electrically coupled in parallel with the batteries of the second battery pack (as will be described in greater detail below with reference to FIG. 15).

Figure 11:
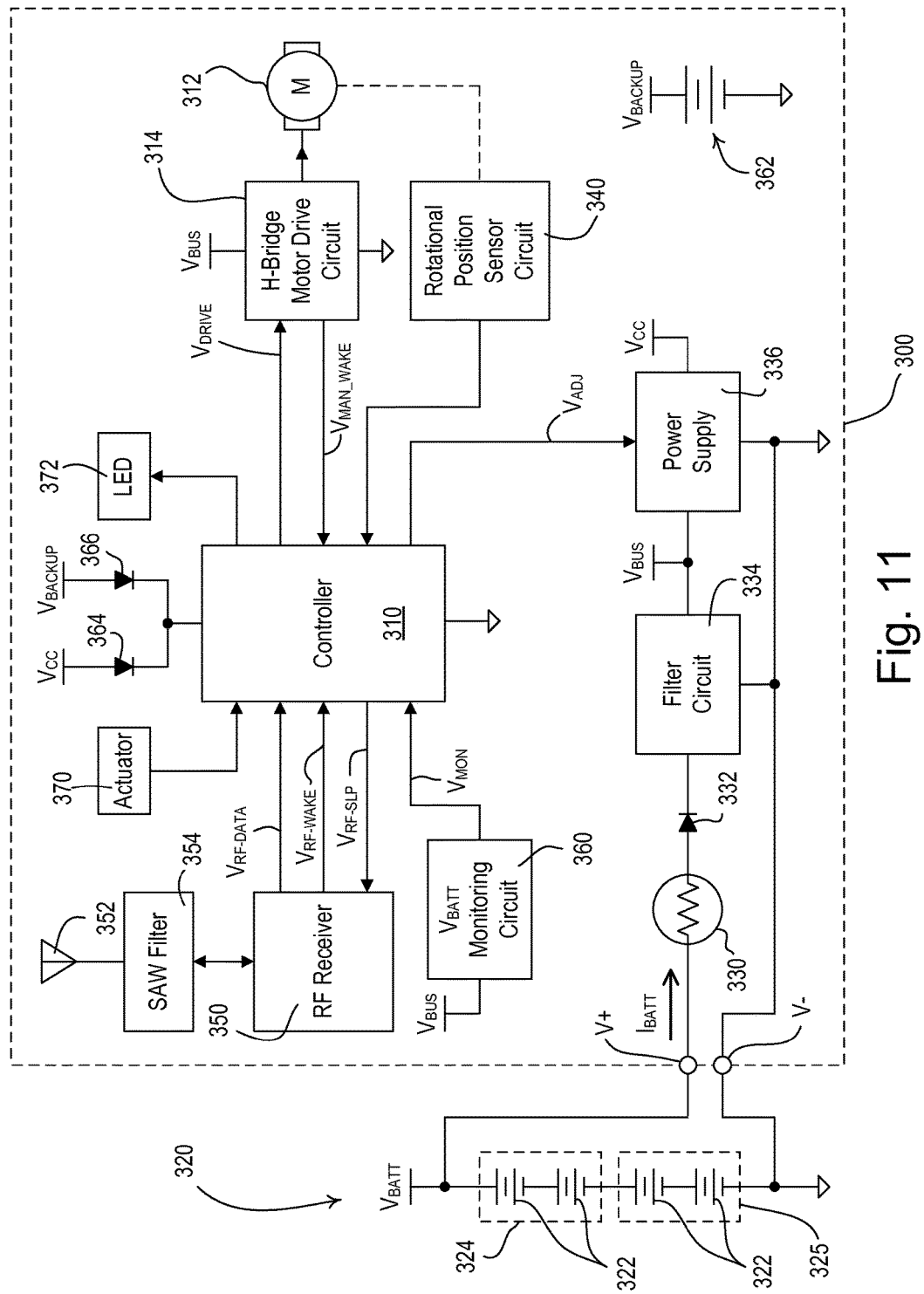
FIG. 11 is a simplified block diagram of an example motor drive unit of a battery-powered motorized window treatment having a battery-powered supply.

FIG. 11 is a simplified block diagram of a motor drive unit 300 for a motorized window treatment (e.g., the motor drive unit 120 of the battery-powered motorized window treatment 110 of FIG. 1 and/or the motor drive unit of the battery-powered motorized roller shade 210 of FIG. 8). The motor drive unit 300 may comprise a controller 310 for controlling the operation of a motor 312 (e.g., the motor 140 of motor drive unit 120 and/or a motor of the motor drive unit of the battery-powered roller shade 210), which may comprise, for example, a DC motor. The controller 310 may comprise, for example, a microprocessor, a programmable logic device (PLD), a microcontroller, an application specific integrated circuit (ASIC), a field-programmable gate array (FPGA), or any suitable processing device or control circuit. The controller 310 may be coupled to a motor drive circuit 314 (e.g., a transistor-bridge drive circuit, such as an H-bridge drive circuit) for driving the motor 312 via a set of drive signals $V_{DRIVE}$ to adjust the position of a covering material (e.g., the cellular shade fabric 112 and/or the shade fabric 222) between the fully-open position $P_{FULLY-OPEN}$ and the fully-closed position $P_{FULLY-CLOSED}$.

The motor drive unit 300 may receive power from an example battery-powered supply 320 having a plurality of batteries 322, which may be located in two battery packs 324, 325 (e.g., the battery packs 172, 174 of the motorized window treatment 110 shown in FIG. 4). The batteries 322 of each battery pack 324, 325 may be electrically coupled in series. In addition, the batteries 322 of the first battery pack 324 may be electrically coupled in series with the batteries 322 of the second battery pack 325 for generating a battery voltage $V_{BATT}$ as shown in FIG. 11. The battery packs 224, 325 may be coupled to the motor drive unit 300 via battery connections V+, V−. For example, the batteries 322 may comprise D-cell batteries having rated voltages of approximately 1.5 volts, such that the battery voltage $V_{BATT}$ may have a magnitude of approximately 6 volts. Alternatively, the batteries 322 may be located in a single battery pack (e.g., the battery pack 262 of the motorized roller shade 210 shown in FIG. 9B). The batteries 322 may be the sole source of power for the motor drive unit 300. Alternatively or additionally, the motor drive unit 300 may be powered by other energy storage means (e.g., other batteries or capacitors), one or more solar cells, and/or an external power supply or transformer.

The battery voltage $V_{BATT}$ may be electrically coupled to the circuitry of the motor drive unit 300 through a positive temperature coefficient (PTC) thermistor 330, a diode 332, and a filter circuit 334 to produce a bus voltage $V_{BUS}$ and a battery current $I_{BATT}$ may be conducted through the batteries 322. The bus voltage $V_{BUS}$ may be received by the motor drive circuit 314 for driving the motor 312. The motor drive unit 300 may comprise a power supply 336 (e.g., a linear regulator or a low quiescent current switching mode supply) that may receive the bus voltage $V_{BUS}$ and generate a DC supply voltage $V_{CC}$ for powering the controller 310 and other low-voltage circuitry of the motor drive unit. The diode 332 may operate to prevent the battery current $I_{BATT}$ from having a negative magnitude, for example, reverse current conducted through the batteries 322, which can cause battery leakage.

The PTC thermistor 330 may operate to limit the magnitude of the current drawn by the circuitry of the motor drive unit 300 from the batteries 322, and to protect the circuitry of the motor drive unit in the event of a voltage miswire at the battery terminals. If the limits (i.e., the fully open position $P_{FULLY-OPEN}$ and the fully closed position $P_{FULLY-CLOSED}$) stored in the memory are incorrect, the controller 310 may attempt to drive the motor 312 to move a bottom structure (e.g., the bottom bar 116 and/or the hembar 226) beyond a position that is mechanically allowable. If the movement of the bottom structure is stopped by mechanical constraints before the controller 310 stops driving the motor 312, the motor may drawn a large slug of current from the batteries 322 before the controller 310 notices that the bottom structure has stopped moving and stops driving the motor 312.

The PTC thermistor 330 may limit the magnitude of the current drawn from the batteries 322 if the fully open position $P_{FULLY-OPEN}$ and the fully closed position $P_{FULLY-CLOSED}$ stored in the memory are incorrect. For example, the energy used to raise the covering material from the fully closed position $P_{FULLY-CLOSED}$ to the fully open position $P_{FULLY-OPEN}$ may be approximately 78 Joules when the limits are set correctly resulting in a lifetime of the batteries of approximately 3 years (assuming that the covering material is moved twice a day). When the limits are set incorrectly and the PTC thermistor 330 limits the magnitude of the current drawn from the batteries 322, the energy used to raise the bottom bar 116 from the fully closed position $P_{FULLY-CLOSED}$ to the fully open position $P_{FULLY-OPEN}$ may be approximately 83 Joules resulting in a lifetime of the batteries of approximately 2.9 years. However, if the PTC thermistor 330 is not included in the motor drive unit 300 and the limits are set incorrectly, the energy used to raise the bottom bar 116 from the fully closed position $P_{FULLY-CLOSED}$ to the fully open position $P_{FULLY-OPEN}$ may be approximately 103 Joules resulting in a lifetime of the batteries 322 of approximately 2.5-3 years.

The filter circuit 334 may operate to conduct a substantially direct-current (DC) battery current $I_{BATT}$ from the batteries 322 (which will be described in greater detail below with reference to FIG. 12). The battery current $I_{BATT}$ may be characterized by an average current $I_{AVE}$ and may have a small amount of ripple. For example, the magnitude of the average current $I_{AVE}$ of the battery current $I_{BATT}$ may be approximately one amp when the controller 310 is driving the motor 312 at a maximum output torque (i.e., when the duty cycle of the motor voltage $V_{MOTOR}$ is approximately 50%).

The motor drive circuit 314 may receive the bus voltage $V_{BUS}$ and generate a motor voltage $V_{MOTOR}$ across the motor 312 to rotate the motor in response to the drive signals $V_{DRIVE}$ received from the controller 310. The controller 310 may be configured to pulse-width modulate the motor voltage $V_{MOTOR}$ to rotate the motor 312 at a constant rotational speed by controlling the motor drive circuit 314 to supply a pulse-width modulated (PWM) signal to the motor, such that the motor draws a pulse-width modulated motor current $I_{MOTOR}$ current. The controller 310 may be configured to pulse-width modulate the motor voltage $V_{MOTOR}$ at a constant frequency (e.g., approximately 20 kHz) and a variable duty cycle (e.g., approximately 25-50%). The controller 310 may change the rotational speed of the motor 312 by adjusting the duty cycle of the PWM signal applied to the motor and change the direction of rotation of the motor by changing the polarity of the PWM drive signal applied to the motor. The controller 310 may be configured to operate in a sleep mode when the motor 312 is idle in order to preserve the life of the batteries 322.

When first starting up the motor 312 to move the bottom bar from a stopped position, the controller 310 may be configured to adjust the duty cycle of the PWM signal to ramp up the current drawn from the batteries 322 by the motor drive circuit 314 from zero amps until the motor 312 is rotating at the desired constant rotational speed over a ramp time period $T_{RAMP}$. The ramp time period $T_{RAMP}$ may allow chemical reactions in the batteries 322 to stabilize before the motor 312 draws large amounts of current from the batteries. The batteries 322 may conduct high-magnitude pulses of current if the motor 312 is simply turned on at the constant rotational speed without the ramp time $T_{RAMP}$, i.e., before the chemical reactions in the batteries are allowed to stabilize.

Figure 12:
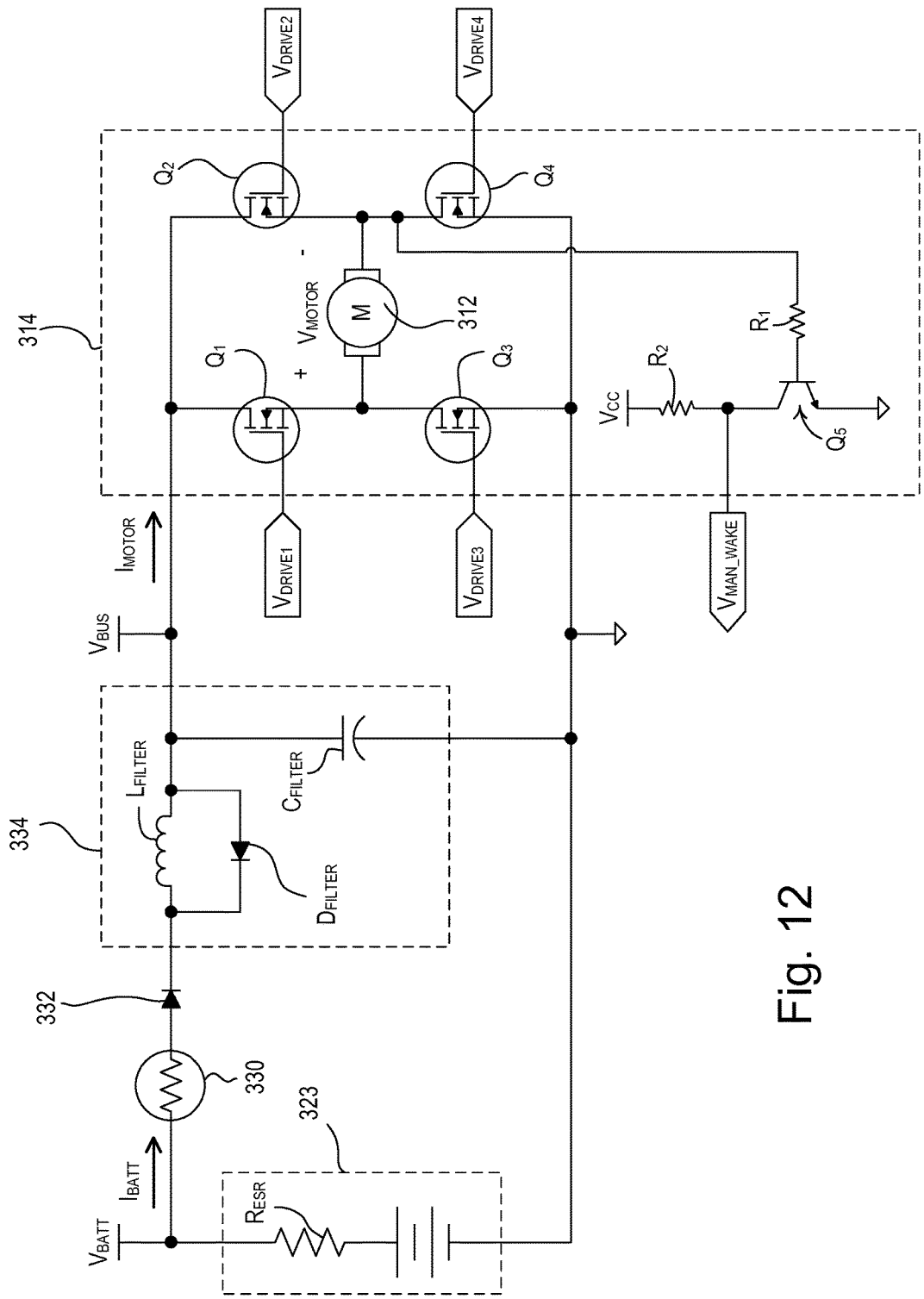
FIG. 12 is a simplified schematic diagram of a portion of the motor drive unit of FIG. 11 showing a motor drive circuit and a filter circuit in greater detail.

FIG. 12 is a simplified schematic diagram of a portion of the motor drive unit 300 showing the motor drive circuit 314 and the filter circuit 334 in greater detail. As shown in FIG. 9, the series-connected batteries 322 are modeled as a battery 323 and are characterized by a total equivalent series resistance $R_{ESR}$ that is connected in series with the series-combination of the batteries. For example, each of the series-coupled batteries 322 may have an individual equivalent series resistance of approximately 0.25Ω to 0.40Ω, such that the total equivalent series resistance $R_{ESR}$ may be approximately 1.5Ω to 2.4Ω when there are six batteries. The battery 323 may be coupled to the filter circuit 334 through the PTC thermistor 330 and the diode 332.

The motor drive circuit 314 may comprise four transistors, such as, for example, four field effect transistors (FETs) $Q_1$, $Q_2$, $Q_3$, $Q_4$. Each FET $Q_1$-$Q_4$ may be driven by the controller 310 via four respective drives signals $V_{DRIVE\_1}$, $V_{DRIVE\_2}$, $V_{DRIVE\_3}$, $V_{DRIVE\_4}$. The FETs $Q_1$-$Q_4$ may be coupled such that, when two of the FETs are conductive (e.g., FETs $Q_3$, $Q_4$), a motor voltage $V_{MOTOR}$ may have a positive magnitude to cause the motor 350 to rotate in a clockwise direction. When the other two FETs of the motor drive circuit 314 are conductive (e.g., FETs $Q_1$, $Q_2$), the motor voltage $V_{MOTOR}$ may have a negative magnitude to cause the motor 350 to rotate in the reverse (e.g., counter-clockwise) direction. To control the speed of the motor 312, the controller 310 may drive at least one of FETs of the motor drive circuit 314 with a PWM control signal. When the motor 312 is idle (e.g., at rest), the controller 310 may drive only the FET $Q_1$ to be conductive and controls FETs $Q_2$, $Q_3$ and $Q_4$ to be non-conductive.

Drawing a pulse-width modulated current with high peak currents from a battery may increase the equivalent series resistance (ESR) of the battery over time, and thus, decrease the usable capacity of the battery. Accordingly, the filter circuit 334 may be operable to conduct a substantially DC battery current $I_{BATT}$ through the battery 323 via an input while supplying the pulse-width modulated motor current $I_{MOTOR}$ via an output to the motor drive circuit 314. The filter circuit 334 may comprise a passive filter circuit, for example, having an inductor $L_{FILTER}$ and a capacitor $C_{FILTER}$ (e.g., an LC filter). The inductor $L_{FILTER}$ and the capacitor $C_{FILTER}$ may form an RLC circuit with the total equivalent series resistance $R_{ESR}$ of the battery 323. For example, the inductor $L_{FILTER}$ may have an inductance of approximately 22 pH and the capacitor $C_{FILTER}$ may have a capacitance of approximately 222 μF, such that the filter circuit 334 may be characterized by a cutoff frequency of approximately 2.3 kHz. The filter circuit 334 may further comprise a diode $D_{FILTER}$ coupled in parallel with the inductor $L_{FILTER}$ for preventing an inductive voltage spike when the current through the inductor (e.g., the battery current $I_{BATT}$) drops to zero amps. Accordingly, the battery current $I_{BATT}$ drawn from the batteries 323 may have a substantially DC magnitude even though the motor current $I_{MOTOR}$ conducted through the output of the filter circuit 334 may be pulse-width modulated. Alternatively, the filter circuit 334 may comprise an active circuit (such as a power converter, e.g., a boost converter) that is configured to operate in a continuous conduction mode, such that the battery current $I_{BATT}$ conducted through the battery 323 has substantially no ripple (e.g., less than approximately 100 milliamps).

Referring back to FIG. 11, the controller 310 may receive information regarding the rotational position and direction of rotation of the motor 312 from a rotational position sensor 340, such as, for example, a transmissive optical sensor circuit. The rotational position sensor 340 may also comprise other suitable position sensors or sensor arrangements, such as, for example, Hall-effect, optical, or resistive sensors. The controller 310 may be configured to determine a rotational position of the motor 312 in response to the rotational position sensor circuit 340, and to use the rotational position of the motor to determine a present position $P_{PRES}$ of the covering material. The controller 310 may comprise an internal non-volatile memory (or alternatively, an external memory coupled to the controller) for storage of the present position Ppm of the covering material, the fully open position $P_{FULLY\text{-}OPEN}$, the fully closed position $P_{FULLY\text{-}CLOSED}$, and the number and type of the batteries 322.

Figure 13:
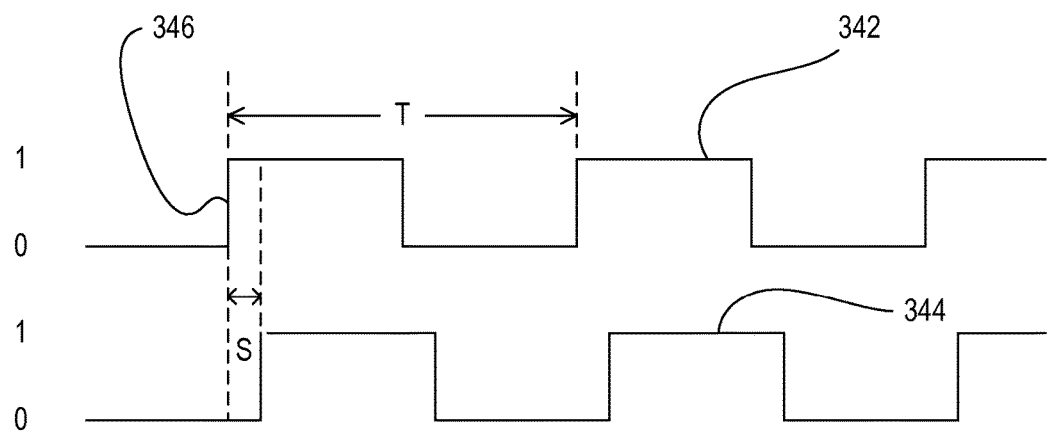
FIG. 13 is a diagram of a first output signal and a second output signal of a transmissive optical sensor circuit of the motor drive unit of FIG. 11.

FIG. 13 is a timing diagram of a first output signal 342 and a second output signal 344 of the rotational position sensor circuit 340. The output signals 342, 344 may be provided to the controller 310 as a train of pulses. The frequency, and thus the period T, of the pulses of the output signals 342, 344 may be a function of the rotational speed of the motor output shaft. The relative spacing S between the pulses of the first and second output signals 342, 344 may be a function of rotational direction. When the motor 312 is rotating in a clockwise direction of the output shaft, the second output signal 344 may lag behind the first output signal 342 by the relative spacing S. When the motor 312 is rotating in the opposite direction, the second output signal 344 may lead the first output signal 342 by the relative spacing S.

The controller 310 may store the present position $P_{PRES}$ of the weighting element 116 in the memory as a number of optical sensors edges between the present position $P_{PRES}$ of the weighting element and the fully-open position $P_{FULLY-OPEN}$. An optical sensor edge may be, for example, the low-to-high transition 346 of the first output signal 342 as shown in FIG. 13. The operation of the H-bridge motor drive circuit 314 and the use of sensor devices to track the direction and speed of the motor drive unit 300 are described in greater detail in commonly-assigned U.S. Pat. No. 5,848,634, issued Dec. 15, 1998, entitled MOTORIZED WINDOW SHADE SYSTEM, and commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, the entire disclosures of which are herein incorporated by reference.

Referring back to FIG. 12, the motor drive circuit 314 may be configured to provide a manual movement wake-up signal $V_{MAN\_WAKE}$ to the controller 310. In the event that the covering material is moved manually, the motor 312 may be back-driven and the motor drive circuit 314 may provide the manual movement wake-up signal $V_{MAN-WAKE}$ to the controller 310. The manual movement wake-up signal $V_{MAN-WAKE}$ may indicate that the covering material is being moved manually (e.g., pulled by a user), and the signal may cause the controller 310 to wake up (e.g., become fully energized) in the event that the controller is sleeping (e.g., operating in a low power mode). Thus, the controller 310 may continue to monitor the output of the rotational position sensor circuit 340. As shown in FIG. 12, one terminal of the motor 312 may be coupled to the base of an NPN bipolar junction transistor $Q_5$ via a resistor $R_1$. The collector of the transistor $Q_5$ may be coupled to the supply voltage $V_{CC}$ via a resistor $R_2$. The manual movement wake-up signal $V_{MAN-WAKE}$ may be generated at the junction of the collector of the transistor $Q_5$ and the resistor $R_2$, which may be coupled to the controller 310. When the motor 312 is rotated in response to a manual action, a back electromagnetic force (EMF) may be generated across the motor 312 and the transistor $Q_5$ may become conductive, thus driving the manual movement wake-up signal $V_{MAN-WAKE}$ low. The controller 310 may be configured to wake-up automatically in response to detecting such a high-to-low transition on one of its input ports.

Once the controller 310 wakes up in response to the manual movement wake-up signal $V_{MAN-WAKE}$, the controller 310 may monitor the output of the rotational position sensor circuit 340 to track the position of the motor 312 (as will be discussed in greater detail below with reference to FIG. 16). In addition, the controller 310 may further wake-up periodically (e.g., once each second) to determine whether the covering material is moving or has moved as a result of a manual adjustment. Further, the back EMF generated across the motor 312 when the covering material is manually moved may be used to charge an energy storage device (such as a bus supply capacitor or ultra-capacitor) or a separate power supply for powering the controller 310, such that the controller may be operable to keep track of the position of the cellular shade fabric when the batteries 322 are depleted. In addition, the back EMF generated across the motor 312 when the covering material is manually moved can also be used to charge a bus supply capacitor or ultra-capacitor that stores a charge for maintaining data stored in the memory of the controller 310.

Referring back to FIG. 11, the motor drive unit 300 may comprise a communication circuit, e.g., an RF receiver 350 coupled to an antenna 352 (e.g., the antenna 160) for receiving RF signals from a remote control (e.g., the remote control 190). The antenna 352 may be coupled to the RF receiver 350 via a surface acoustic wave (SAW) filter 354 (e.g., part number B3580 as manufactured by Epcos AG), which acts to filter RF noise. The RF receiver 350 may be configured to provide an RF data control signal $V_{RF-DATA}$ representative of the received RF signals to the controller 310, and the controller may be configured to control the motor drive circuit 314 in response to the received signals.

The controller 310 may be coupled to the power supply 336 for controlling the operation of the power supply. The controller 310 may generate a voltage adjustment control signal $V_{ADJ}$ that is provided to the power supply 336 for adjusting the magnitude of the DC supply voltage $V_{CC}$ between a first nominal magnitude (e.g., approximately 2.7 volts) and a second increased magnitude (e.g., approximately 3.3 volts). The power supply 336 may comprise, for example, an adjustable linear regulator (or a switching mode supply) having one or more feedback resistors that are switched in and out of the circuit by the controller 310 to adjust the magnitude of the DC supply voltage $V_{CC}$. The controller 310 may adjust the magnitude of the DC supply voltage $V_{CC}$ to the second increased magnitude while the controller is driving the FETs $Q_1$-$Q_4$ of the motor drive circuit 314 to rotate the motor 312 (since the controller may require an increased supply voltage to drive the gates of the FETs). The controller 310 may adjust the magnitude of the DC supply voltage $V_{CC}$ to the first nominal magnitude when the controller is not controlling the motor drive circuit 314 to rotate the motor 312 (e.g., when the controller is in the sleep mode). The magnitude of the idle currents drawn by the controller 310, the RF receiver 350, and other low-voltage circuitry of the motor drive unit 300 may be significantly smaller when these circuits are powered by the first nominal magnitude of the DC supply voltage $V_{CC}$.

The motor drive unit 300 may further comprise a battery monitoring circuit 360 that may receive the bus voltage $V_{BUS}$ and may provide a battery-monitor control signal $V_{MON}$ representative of the magnitude of the battery voltage $V_{BATT}$ to the controller 310. The battery monitoring circuit 360 may comprise for example a resistive voltage divider circuit (not shown) coupled in series between the bus voltage $V_{BUS}$ and circuit common, such that the battery-monitor control signal $V_{MON}$ may simply be a scaled version of the battery voltage $V_{BATT}$. The controller 310 may include an analog-to-digital converter (ADC) for receiving and measuring the magnitude of the battery-monitor control signal $V_{MON}$ to thus determine the magnitude of the battery voltage $V_{BATT}$. The battery monitoring circuit 360 may further comprise a controllable switch, e.g., a NPN bipolar junction transistor (not shown), coupled in series with the resistive divider. The controller 310 may be configured to render the controllable switch conductive, such that the battery-monitor control signal $V_{MON}$ is representative of the magnitude of the battery voltage $V_{BATT}$, and to render the controllable switch non-conductive, such that the resistive divider may not conduct current and energy may be conserved in the batteries 322.

The controller 310 may be configured to determine that the magnitude of the battery voltage $V_{BATT}$ is getting low in response to the battery-monitor control signal $V_{MON}$ received from the battery monitoring circuit 360. Specifically, the controller 310 may be configured to operate in a low-battery mode when the magnitude of the battery voltage $V_{BATT}$ drops below a first predetermined battery-voltage threshold $V_{B-TH1}$ (e.g., approximately 1.0 volts per D-cell battery). The controller 310 may be configured to recall the number of batteries 322 from memory for determining the value of the first predetermined battery-voltage threshold $V_{B-TH1}$. The controller 310 may control the motor drive circuit 314 so that the motor 312 is operated at a reduced speed (e.g., at half speed) to reduce the instantaneous power requirements on the batteries 322 when the controller 310 is operating in the low-battery mode. This may serve as an indication to a consumer that the battery voltage $V_{BATT}$ is low and the batteries 322 need to be changed.

When the magnitude of the battery voltage $V_{BATT}$ drops below a second predetermined battery-voltage threshold $V_{B-TH2}$ (less than the first predetermined battery-voltage threshold $V_{B-TH1}$, e.g., approximately 0.9 V per battery) while operating in the low-battery mode, the controller 310 may shut down electrical loads in the motor drive unit 300 (e.g., by disabling the RF receiver 350 and other low-voltage circuitry of the motor drive unit) and prevent movements of the covering material except to allow for at least one additional movement of the cellular shade fabric to the fully-open position $P_{FULLY-OPEN}$. Having the covering material at the fully-open position $P_{FULLY-OPEN}$ may allow for easy replacement of the batteries. The second predetermined battery-voltage threshold $V_{B-TH2}$ may be sized to provide enough reserve energy in the batteries 322 to allow for the at least one additional movement of the covering material to the fully-open position $P_{FULLY-OPEN}$.

When the magnitude of the battery voltage $V_{BATT}$ drops below a third predetermined battery-voltage threshold $V_{B-TH3}$ (less than the second predetermined battery-voltage threshold $V_{B-TH2}$, e.g., approximately 0.8 V per battery), the controller 310 may be configured to shut itself down (e.g., to hibernate) such that the circuitry of the motor drive unit 300 may draw a minimal amount of current from the batteries 322 in order to protect against any potential leakage of the batteries.

Rather than comparing the magnitude of the battery voltage $V_{BATT}$ to three different battery-voltage thresholds $V_{B-TH1}$, $V_{B-TH2}$, $V_{B-TH3}$, the controller 310 may be configured to monitor the magnitude of the battery voltage $V_{BATT}$ while the controller is driving the motor drive circuit 312 to rotate the motor 312. Since the batteries 322 are each characterized by an equivalent series resistance (ESR), the magnitude of the battery voltage $V_{BATT}$ may be the lowest magnitude when the motor 312 is rotating and drawing a maximum amount of current (e.g., a peak current) from the batteries. Accordingly, the controller 310 may only compare the magnitude of the battery voltage $V_{BATT}$ to a single battery-voltage threshold $V_{B-TH}$ (e.g., approximately 0.8 volt per battery). When the magnitude of the battery voltage $V_{BATT}$ drops below the battery-voltage threshold $V_{B-TH}$ for the first time while the controller 310 is driving the motor 312 (e.g., when the controller is operating in a normal mode of operation), the controller may then begin operating in a first low-battery mode during which the controller may rotate the motor at a reduced speed (e.g., at half speed). Accordingly, the motor 312 may draw less current from the batteries 322 in the first low-battery mode and the magnitude of the battery voltage $V_{BATT}$ may recover, i.e., increase back up above the battery-voltage threshold $V_{B-TH}$.

When the magnitude of the battery voltage $V_{BATT}$ drops below the battery-voltage threshold $V_{B-TH}$ again (e.g., while the controller 310 is driving the motor 312 in the first low-battery mode), the controller may begin operating in a second low-battery mode during which the controller 310 may stop driving the motor 312 and simply blink the LED 372 (e.g., to illuminate the actuator 126) to provide feedback to the user that the battery voltage $V_{BATT}$ is low. Once again, the battery voltage $V_{BATT}$ may recover and rise above the battery-voltage threshold $V_{B-TH}$. When the magnitude of the battery voltage $V_{BATT}$ drops below the battery-voltage threshold $V_{B-TH}$ while in the second low-battery mode, the controller 310 may enter a third low battery mode in which the controller may hibernate (e.g., shuts down), such that the circuitry of the motor drive unit 120 may draw a minimal amount of current from the batteries 322 and the batteries may be protected against potential leakage.

Because the controller 310 may be monitoring the magnitude of the battery voltage $V_{BATT}$ while the motor drive circuit 314 is driving the motor 312 with the PWM signal at the constant frequency (i.e., approximately 20 kHz), a low-pass filter circuit may be coupled between the output of the battery monitoring circuit 360 and the controller 310 to thus smooth out the 20-kHz ripple on the battery voltage $V_{BATT}$. In addition, the controller 310 may be configured to sample the filtered battery-monitor control signal $V_{MON}$ at a sampling period (e.g., approximately 3 pec) to collect a predetermined number of samples (e.g., approximately 16 samples) and then average the predetermined number of samples to generate a battery voltage sample that may be compared to the battery-voltage threshold $V_{B-TH}$.

As shown in FIG. 11, the motor drive unit 300 may also comprise an alternate (or supplemental) power source, such as a backup battery 362 (e.g., a long-lasting battery), which may generate a backup supply voltage $V_{BACKUP}$ (e.g., approximately 3.0 volts) for powering the controller 310. The DC supply voltage $V_{CC}$ generated by the power supply 336 may be coupled to the controller 310 via a first diode 364, and the backup supply voltage $V_{BACKUP}$ may be coupled to the controller via a second diode 366. The alternate power source may provide the controller 310 with power when the batteries 322 are removed for replacement, or otherwise depleted, such that the position data relating to the position of the window treatment that may be stored in the memory of the controller 310 may be maintained. Alternatively, a large bus capacitor or an ultra-capacitor may be coupled to the controller 310 (e.g., rather than the backup battery 362), so that even when the batteries 322 are removed for replacement, an adequate charge may remain in the bus capacitor or ultra capacitor to maintain adequate voltage to keep the controller 310 charged for the period of time necessary to replace batteries 322 and thereby prevent loss of stored data in the memory of the controller. In addition, the back EMF generated across the motor 312 when the covering material is manually moved may also be used to charge the large bus capacitor or ultra-capacitor for maintaining data stored in the memory of the controller 310.

Accordingly, the motor drive unit 300 may be configured to keep track of the position of the covering material even when the batteries 322 are removed and/or the window treatment is manually operated (e.g., pulled). The controller 310 may continue to receive signals from rotational position sensor circuit 340 even when the batteries 322 are removed. Because the controller 310 may remain powered, the controller may continue to calculate the position of the covering material when manually adjusted. The motor drive unit 300 may allow a user at any time to manually adjust the position of the motorized window treatment, and the position of the motorized window treatment may always calculated both when the motorized window treatment is moved by the motor or manually.

The controller 310 may be arranged to prevent the motor drive circuit 314 from operating to lower the cellular shade fabric 112 until an upper limit for the fabric is reset after a loss of power, e.g., if the batteries 322 are depleted. Thus, the motor drive unit 300 may not lower from the current raised position in the event of power loss. The user may be required to raise the covering material to the fully-open position before being able to lower the shade fabric.

The controller 310 may be coupled to an actuator 370 (e.g., the actuator 126) for receiving user inputs in response to actuations of the actuator. The controller 310 may be further coupled to a light-emitting diode (LED) 372 for illumination the actuator 370 to provide feedback, for example, during configuration of the motor drive unit 300 or if the battery voltage $V_{BATT}$ is low. The LED 372 may be positioned to illuminate, for example, the translucent actuator 126 of the motorized window treatment 110 as shown in FIGS. 2A and 2B.

The RF receiver 350 and the controller 310 may be configured to operate in a sleep mode (e.g., low-power mode) to conserve battery power. During the sleep mode, the RF receiver 350 may be configured to wake-up periodically to sample (e.g., listen for) any RF signals as will be described in greater detail below. In the event that the RF receiver 350 does detect the presence of any RF signals, the RF receiver may be configured to wake up the controller 310 via an RF wake up signal $V_{RF\_WAKE}$, such that the controller may begin processing the received RF signal. In particular, the RF receiver 350 may wake up the controller 310 in response to detecting any RF energy within a particular frequency band. Each time that the controller 310 wakes up in response to the RF wake up signal $V_{RF\_WAKE}$, additional power may be consumed by the controller (since the controller is fully powered when awake). This additional power consumption may reduce the life of the batteries 322, and as a result, the RF receiver 350 may only wake the controller 310 when necessary.

Figure 14:
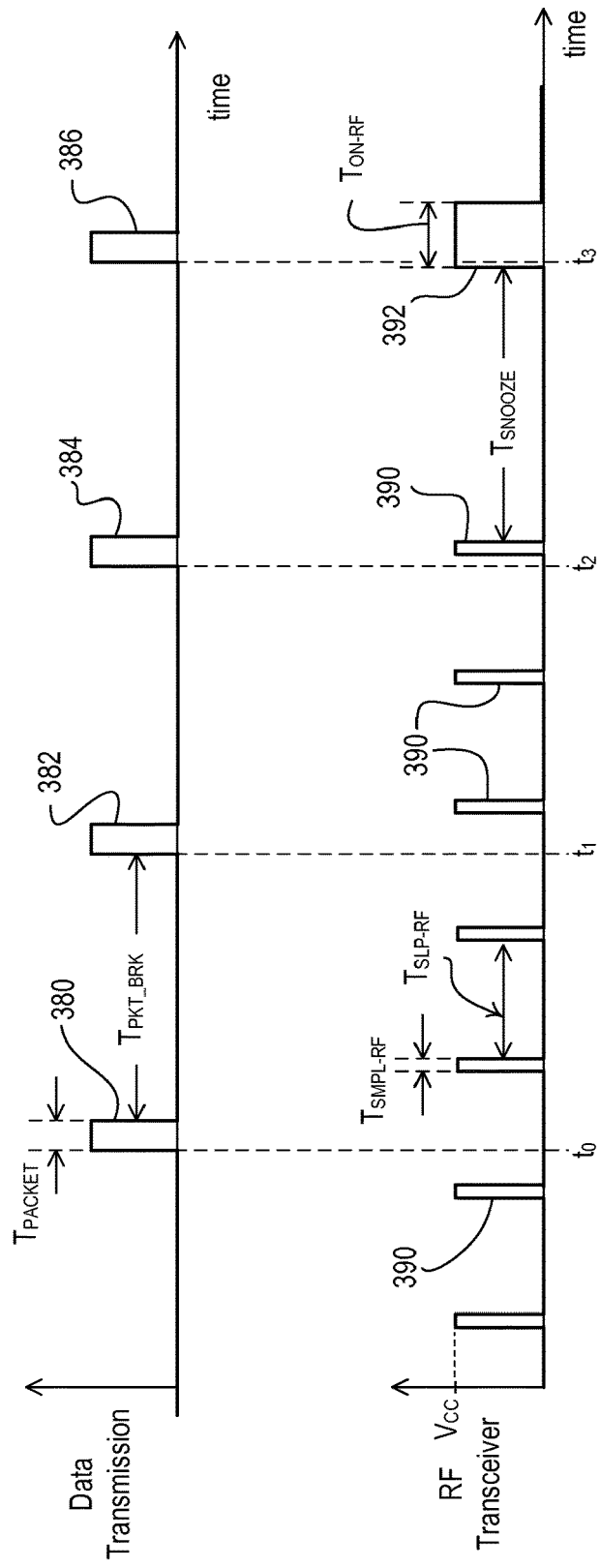
FIG. 14 is a simplified timing diagram of an RF data transmission event and a sampling event.

FIG. 14 is a simplified timing diagram of a data transmission event transmitted by an RF remote control (e.g., the RF remote control 190 and/or the remote control 290) to the motor drive unit 300 and a sampling event of the RF receiver 350. The remote control 190 may transmit packets of data (e.g., the control information) via RF signals with each packet having a packet time period $T_{PACKET}$ (e.g., approximately 5 msec). Each packet of data may be transmitted multiple times (e.g., up to twelve times) during a given data transmission event. Between each packet of data, there may be a packet break time period $T_{PKT\_BRK}$ (e.g., approximately 70 ms), such that the remote control may transmit digital messages at a transmission rate of approximately 13.3 packets per second. The RF receiver 350 of the motor drive unit 300 may be configured to wake up and listen for any RF signals during an RF sampling time period $T_{SMPL-RF}$. If no RF signals are detected during the RF sample time period $T_{SMPL-RF}$, then the RF receiver 350 may go to sleep for an RF sleep time period $T_{SLP-RF}$, such that the RF receiver may sample the RF data at a sampling period $T_{SAMPLE}$. Alternatively, the break time period $T_{PKT\_BRK}$ may not be a fixed value, but may be a varying or random time between each of the transmitted packets.

The RF sample time period $T_{SMPL-RF}$ and the RF sleep time period $T_{SLP-RF}$ of the RF receiver 350 may be sized appropriately to ensure that the RF sample time period $T_{SMPL-RF}$ may coincide with at least one packet of a predetermined number of consecutive packets of a data transmission event. As a result, the RF sleep time period $T_{SLP-RF}$ of the RF receiver 350 may be much longer than the packet time period $T_{PACKET}$. In addition, the RF sample time period $T_{SMPL-RF}$ may be significantly shorter than the packet time period $T_{PACKET}$. Accordingly, the RF receiver 350 may be configured to sleep for longer periods of time than prior art RF receivers, thus extending the lifetime of the batteries 322 powering the motor drive unit 300. For example, the RF sample time period $T_{SMPL-RF}$ and the RF sleep time period $T_{SLP-RF}$ may be sized to be approximately 0.1 msec and 17.8 msec, respectively, to ensure that the RF sample time period $T_{SMPL-RF}$ may coincide with at least one packet of five consecutive packets of a data transmission event.

Four packets 380, 382, 384, and 386 of a data transmission event are shown in FIG. 22B. At time $t_0$, the remote control may begin to transmit the first packet 380 via the RF signals. The first packet 380 may not received by the RF receiver 350 because the packet is transmitted during the RF sleep time period $T_{SLP-RF}$ (i.e., while the RF receiver is sleeping). In other words, the transmission of packet 380 does not coincide with an RF sampling event 390 of the RF receiver. Similarly, the second packet 382 transmitted at time $t_1$ may not received by the RF receiver 350 because the packet is transmitted during the RF sleep time $T_{SLP-RF}$ and does not coincide with one of the RF sampling events 390 of the RF receiver 350.

At time $t_2$, the third packet 384 may be transmitted and may be detected by the RF receiver 350, such that the RF receiver wakes up the controller 310. Since the controller 310 wakes up in the middle of the transmission of the third packet 350 (i.e., has missed the beginning of the transmission of the third packet), the controller may be unable to properly process the data contained within the third packet. However, the controller 310 may be configured to process the third packet 384 sufficiently to determine that a fourth packet 386 will be transmitted after the packet break time $t_{PKT\_BRK}$. Accordingly, the controller 310 and the RF receiver 350 may be configured to enter the sleep mode for a snooze time period $T_{SNOOZE}$, which may be approximately equal to or slightly less than the packet break time period $T_{PKT\_BRK}$. As shown in FIG. 11, the snooze time period $T_{SNOOZE}$ may expire just before time $t_3$, when the fourth packet 286 may be transmitted. In other words, the duration of the snooze time period $T_{SNOOZE}$ may be short enough to ensure that the RF receiver 350 may be awake in time to receive the complete transmission of the fourth packet 386.

When the snooze time period $T_{SNOOZE}$ expires, the RF receiver 350 and the controller 310 may wake up, and the RF transceiver may begin to listen for RF signals for at least the RF sample time period $T_{SMPL-RF}$. Because the RF receiver 350 and the controller 310 may be awake at time $t_3$ when the remote control 190 begins to transmit the fourth packet 286, the receiver may be able to receive the entire packet. The RF receiver 350 may be configured to remain on for an RF on time period $T_{ON-RF}$ and receive the entire packet 386 during an RF receiving event 392, such that the controller 310 may be able to properly process the packet 386 of data. Thus, because the RF receiver 350 and the controller 310 may go back to sleep during the snooze time period $T_{SNOOZE}$ (and may not stay awake and fully powered while waiting for the next packet to be transmitted), the life of the batteries 322 may be further conserved.

The motor drive unit 120 of the motorized window treatment 110 shown in FIG. 4 and the motor drive unit 300 shown in FIG. 11 are each powered by four batteries. However, to provide a motorized window treatment having a larger and/or heavier covering material, the motor drive unit may need to be powered by more than four batteries. For example, a headrail of a motorized window treatment having a larger cellular shade fabric may be longer than the headrail 114 of the motorized window treatment 110 shown in FIG. 1 and thus may accommodate additional batteries on each side of the motor drive unit 120. In addition, a battery compartment of a motorized roller shade having a larger shade fabric may be longer than the battery compartment 260 and thus may accommodate additional battery packs and/or batteries.

Figure 15:
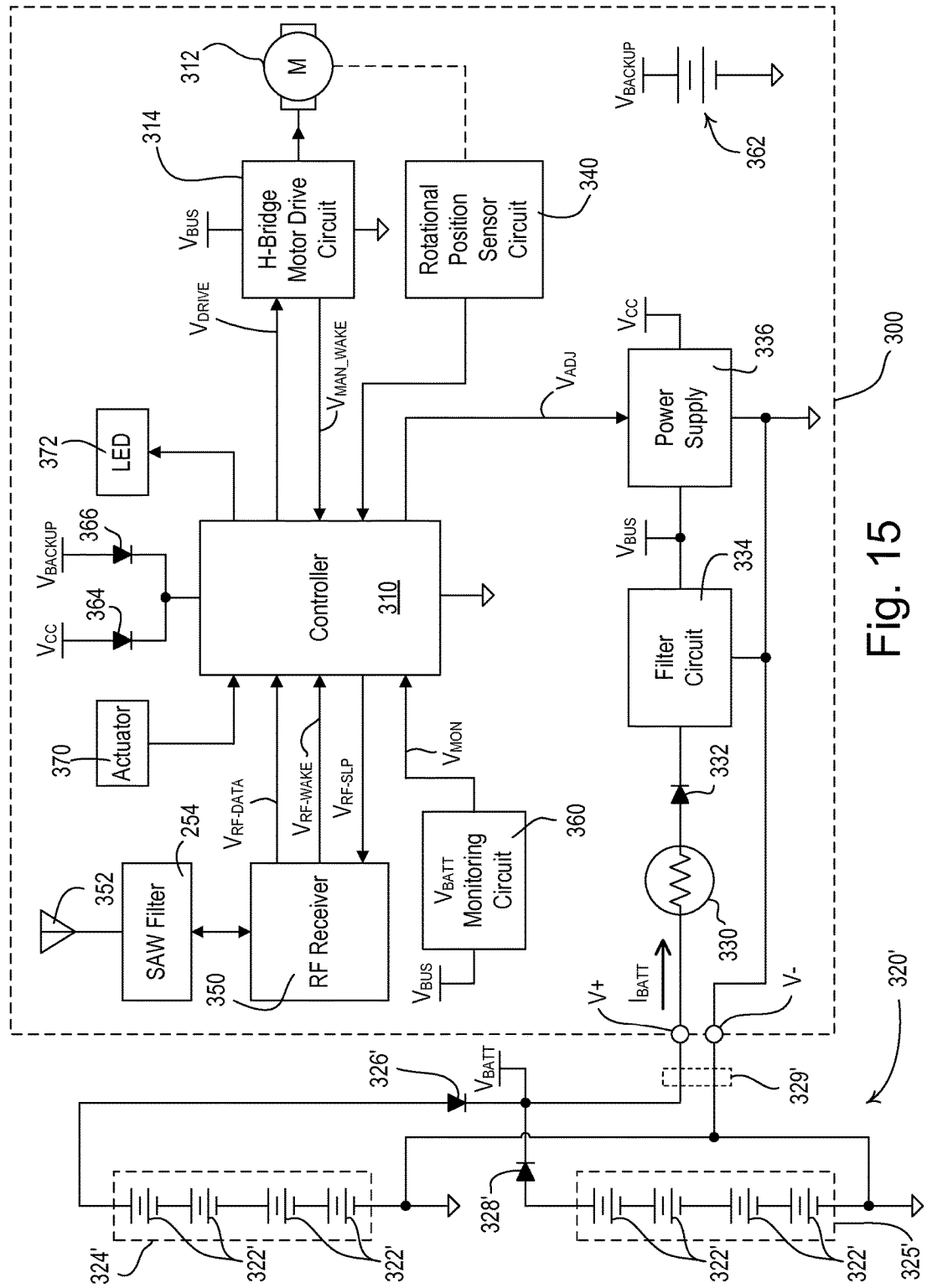
FIG. 15 is a simplified block diagram of the motor drive unit of FIG. 8 powered by a different battery-powered supply.

FIG. 15 is a simplified block diagram of the motor drive unit 300 shown powered by another example battery-powered supply 320', for example, to enable the motor drive unit to drive a larger and/or heavier covering material. The battery-powered supply 320' of FIG. 17 may comprise two battery packs 324', 325' (e.g., the battery packs 172, 174 of the motorized window treatment 110 shown in FIG. 4 and/or two battery packs installed in the battery compartment 260 of the motorized roller shade 210 shown in FIG. 9B). For example, the battery packs 324', 325' may be located on each side of the motor drive unit 300 in a headrail that may be longer than the headrail 114 of the motorized window treatment 110 shown in FIG. 4. The battery packs 324', 325' may also be located in a battery compartment that may be longer than the battery compartment 260 of the motorized roller shade 210 shown in FIG. 9B. Each battery pack 324', 325' may comprise multiple batteries 322' (e.g., four or six D-cell batteries) electrically coupled in series.

The series-connected batteries 322' of the first battery pack 324' may be electrically coupled in parallel with the series-connected batteries 322' of the second battery pack 325' for generating a battery voltage $V_{BATT}$ (e.g., approximately 6 volts). The battery-powered supply 320' may comprise a battery-balancing circuit including two diodes 326', 328'. The first diode 326' may be electrically coupled in series with the batteries 322' of the first battery pack 324', and the second diode 328' may be electrically coupled in series with the batteries 322' of the second battery pack 325'. The cathodes of the diodes 326', 328' may be electrically coupled together to generate the battery voltage $V_{BATT}$ at an output of the battery-balancing circuit (e.g., at the junction of the diodes), which may be electrically coupled to the positive battery connection V+.

The antenna 352 of the motor drive unit 300 may comprise a wire antenna that extends from the motor drive unit adjacent to the battery connections V+, V−. The battery-powered supply 320' may further comprise one or more ferrite beads 329' mechanically coupled around the electrical wires (e.g., the power wires) between the diodes 326', 328' and the battery connections V+, V− of the motor drive unit 300 adjacent to the motor drive unit. The ferrite beads 329' may operate to prevent losses in the received RF signals due to RF coupling between the antenna 352 and the electrical wires between the diodes 326', 328' and the battery connections V+, V−.

When the batteries 322' are first installed, the total voltage produced by the series-connected batteries in one of the battery packs (e.g., battery pack 324') may be larger than the total voltage produced by the series-connected batteries in the other battery pack (e.g., the battery pack 325'). The battery pack having the larger voltage will conduct the battery current $I_{BATT}$ first through the series-connected diode (e.g., the diode 326') until the voltage produced by the two battery packs 324', 325' are approximately equal. After this time, the battery packs 324', 325' will drain in parallel. For example, the battery current $I_{BATT}$ will be split between the two battery packs 324', 325' causing the batteries 322' to drain slower than if less batteries were provided. The capacity of each of the batteries 322' (e.g., in mAh) may increase as the current conducted through the battery decreases. Accordingly, since the current conducted through the batteries 322' of each of the parallel-coupled battery packs 324', 325' may be less than (e.g., approximately half of) the current conducted through the batteries if the battery packs were coupled in series, the batteries of the parallel-coupled battery packs 324', 325' may achieve an even greater battery life.

Alternatively, the second battery pack 325' could be replaced with an external wired DC power supply and/or transformer (not shown). The DC power supply may be coupled to the motor drive unit 300 through the second diode 328'. The external DC power supply may receive power from an alternating-current (AC) power source and may generate a supply voltage having a magnitude greater than the battery voltage generated by the first battery pack 324', such that the DC power supply is configured to supply power to the motor drive unit when the AC power source is coupled to the DC power supply. However, if DC power supply is uncoupled from the AC power source (e.g., in the event of a power outage), the supply voltage generated by the DC power supply may drop to approximately zero volts and the motor drive unit will draw current from the first battery pack 324'.

Figure 16:
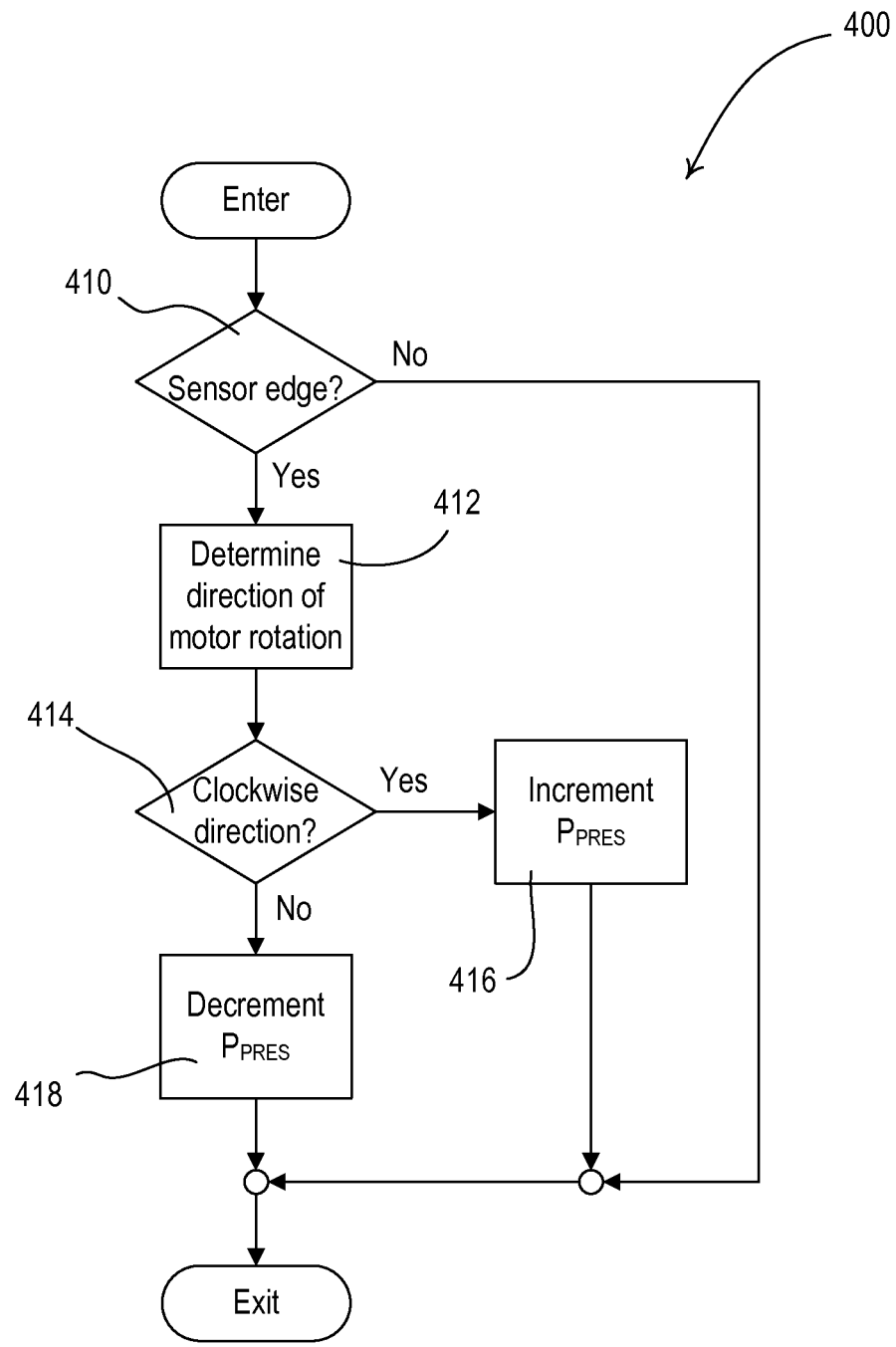
FIG. 16 is a simplified flowchart of an example sensor edge procedure executed periodically by a controller of a motor drive unit of a motorized window treatment.

FIG. 16 is a simplified flowchart of an example sensor edge procedure 400, which may be executed by a controller of a motor drive unit (e.g., the controller 310 of the motor drive unit 300 shown in FIG. 11). For example, the controller may execute the sensor edge procedure 400 every ten milliseconds to determine the rotational position and direction of a motor (e.g., the motor 312) in response to a rotational position sensor (e.g., the rotational position sensor circuit 340). In addition, the sensor edge procedure 400 may be executed by the controller in response to receiving a control signal (e.g., the manual movement wake-up signal $V_{MAN\_WAKE}$ generate by the motor drive circuit 314). If the controller has not received a sensor edge (e.g., a rotational position sensor edge 346 as shown in FIG. 13) at step 410, the sensor edge procedure 400 may simply exit. However, if the controller has received a sensor edge (e.g., from the rotational position sensor circuit 340) at step 410, the controller may determine the direction of rotation of the motor by comparing the consecutive edges of the first and second output signals 342, 344 at step 412. If the motor is rotating in the clockwise direction at step 414, the controller 310 may increment the present position $P_{PRES}$ (e.g., in terms of rotational position sensor edges) by one at step 416. If the motor is rotating in the counter-clockwise direction at step 414, the controller may decrement the present position $P_{PRES}$ by one at step 418. After the present position $P_{PRES}$ is incremented or decremented at steps 416 and 418, respectively, the sensor edge procedure 400 may exit.

Figure 17:
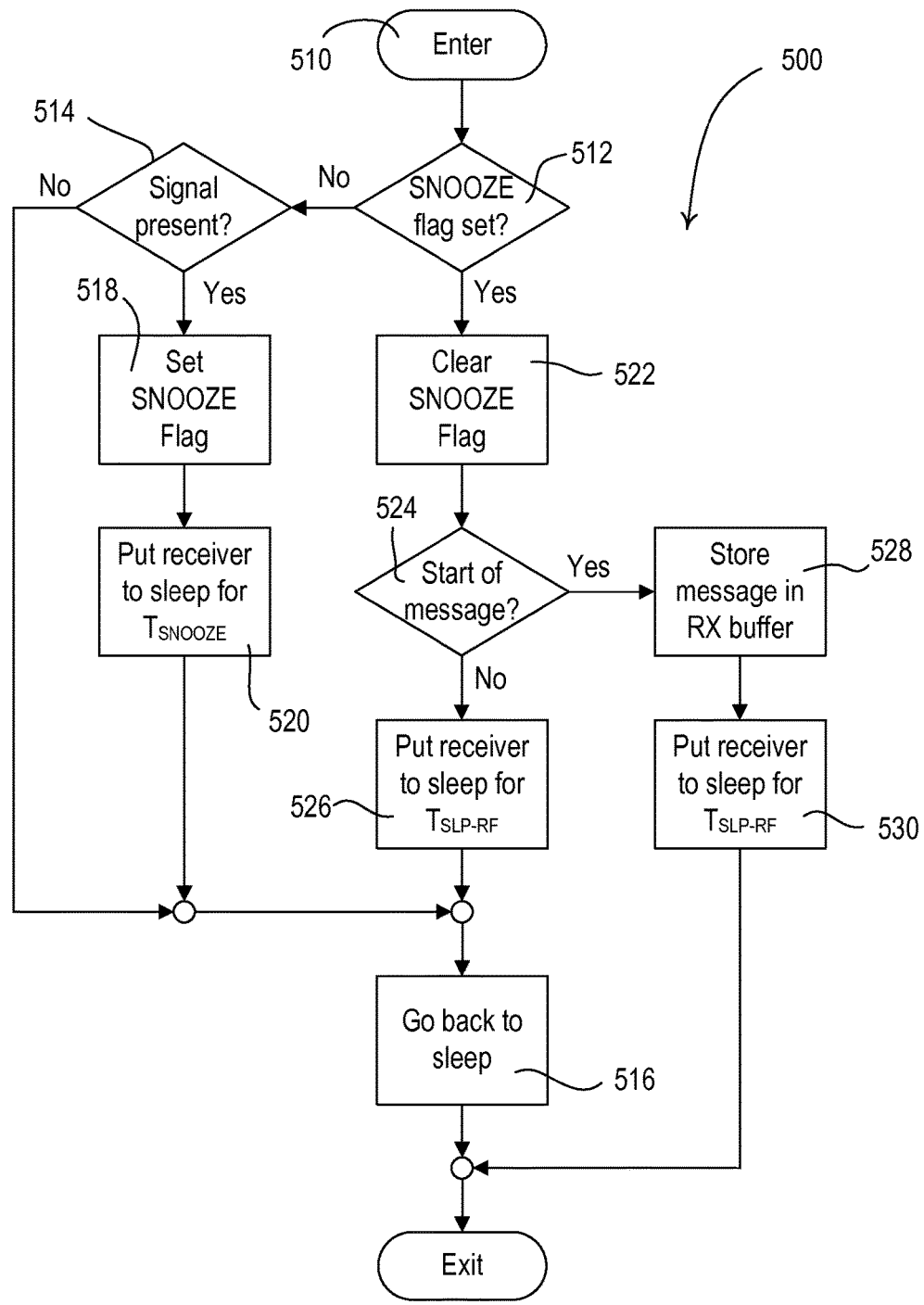
FIG. 17 is a simplified flowchart of an example RF signal receiving procedure executed by a controller of a motor drive unit of a motorized window treatment.

FIG. 17 is a simplified flowchart of an example RF signal receiving procedure 500, which may be executed by a controller of a motor drive unit (e.g., the controller 310 of the motor drive unit 300 shown in FIG. 11). For example, the controller may execute the RF signal receiving procedure 500 after being awakened in response to a control signal received from an RF receiver (e.g., the RF wake up signal $V_{RF\_WAKE}$ received from the RF receiver 350) at step 510. The controller may use a SNOOZE flag to keep track of when the RF receiver has been put to sleep for the snooze time period $T_{SNOOZE}$. If the SNOOZE flag is not set at step 512 (i.e., the RF receiver has not been put to sleep for the snooze time period $T_{SNOOZE}$) and the controller does not detect an indication that an RF signal is present at step 514, the controller may simply go back to sleep at step 516 and the RF signal receiving procedure 500 may exit. However, if the controller detects an RF signal at step 514, the controller may set the SNOOZE flag at step 518, and put the RF receiver to sleep for the snooze time period $T_{SNOOZE}$ at step 520. The controller may then go back to sleep at step 516, and the RF signal receiving procedure 500 may exit.

If the SNOOZE flag is set at step 512 (e.g., the RF receiver has been put to sleep for the snooze time period $T_{SNOOZE}$), the controller may first clear the SNOOZE flag at step 522 and then get ready to receive a digital message. If the RF receiver is not receiving the start of a digital message at step 524, the controller may put the RF receiver to sleep for the RF sleep time period $T_{SLP-RE}$ at step 526 and go back to sleep at step 516, before the RF signal receiving procedure 500 exits. However, if the RF receiver is receiving the start of a digital message at step 524, the controller may store the received message in a receive (RX) buffer at step 528 and put the RF receiver to sleep for the RF sleep time period $T_{SLP-RE}$ at step 530. The RF signal receiving procedure 500 may exit without the controller being put back to sleep. The controller may go back to sleep after processing the received digital message.

Figure 18:
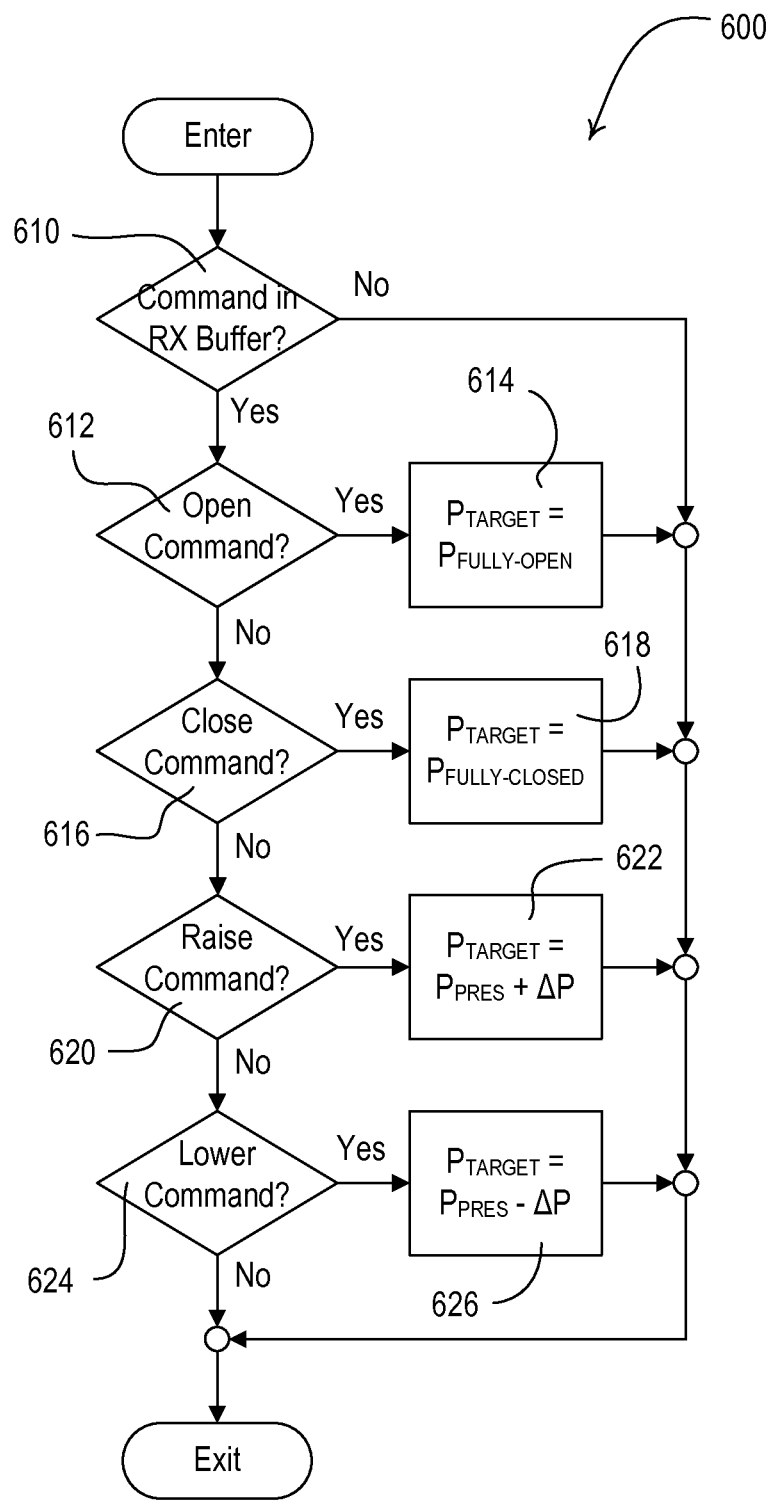
FIG. 18 is a simplified flowchart of an example command procedure executed periodically by a controller of a motor drive unit of a motorized window treatment.

FIG. 18 is a simplified flowchart of a command procedure 600, which may be executed periodically by a controller of a motor drive unit (e.g., the controller 310 of the motor drive unit 300 shown in FIG. 11). If there is not a command in the RX buffer at step 610, the command procedure 600 may simply exit. However, if there is an open command in the RX buffer at step 612, the controller may set the target position $P_{TARGET}$ equal to the fully-open position $P_{FULLY-OPEN}$ at step 614, and the command procedure 600 may exit. If the received command is a close command at step 616, the controller may set the target position $P_{TARGET}$ equal to the fully-closed position $P_{FULLY-CLOSED}$ at step 618 and the command procedure 600 may exit. If the received command is a raise command at step 620 or a lower command at step 624, the controller may respectively increase the target position $P_{TARGET}$ by a predetermined increment ΔP at step 622 or decrease the target position $P_{TARGET}$ by the predetermined increment ΔP at step 626, before the command procedure 600 exits.

Figure 19:
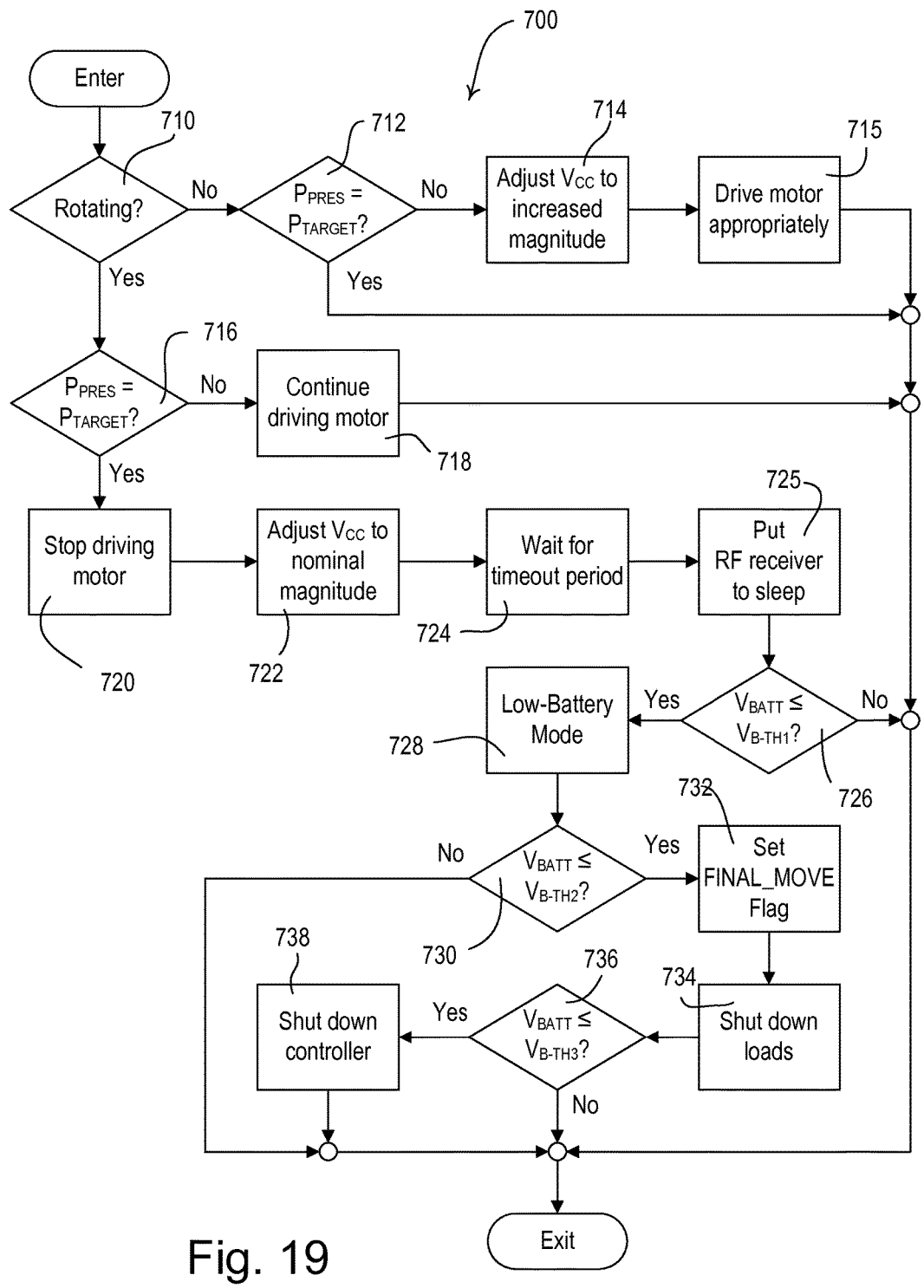
FIG. 19 is a simplified flowchart of an example motor control procedure executed periodically by a controller of a motor drive unit of a motorized window treatment.

FIG. 19 is a simplified flowchart of an example motor control procedure 700, which may be executed periodically (e.g., every two milliseconds) by a controller of a motor drive unit (e.g., the controller 310 of the motor drive unit 300) for controlling a motor (e.g., the motor 312). If the motor is not presently rotating at step 710 and the present position $P_{PRES}$ is equal to the target position $P_{TARGET}$ at step 712, the motor control procedure 700 may simply exit without controlling the motor. However, if the motor is not presently rotating at step 710 and the present position $P_{PRES}$ is not equal to the target position $P_{TARGET}$ at step 712, the controller may control the voltage adjustment control signal $V_{ADJ}$ to adjust the magnitude of the DC supply voltage $V_{CC}$ to the increased magnitude (i.e., approximately 3.3 volts) at step 714. The controller may then begin to control the drive signal $V_{DRIVE}$ to drive the motor appropriately at step 715 (e.g., to move the covering material towards the target position $P_{TARGET}$).

If the motor is presently rotating at step 710, but the present position $P_{PRES}$ is not yet equal to the target position $P_{TARGET}$ at step 716, the controller may continue to drive the motor appropriately at step 718 and the motor control procedure 700 may exit. If the motor is presently rotating at step 710 and the present position $P_{PRES}$ is now equal to the target position $P_{TARGET}$ at step 716, the controller may stop driving the motor at step 720 and control the voltage adjustment control signal $V_{ADJ}$ to adjust the magnitude of the DC supply voltage $V_{CC}$ to the nominal magnitude (i.e., approximately 2.7 volts) at step 722. The controller may then wait for a timeout period (e.g., approximately 200 milliseconds) at step 724, and put the RF receiver back to sleep at step 725.

The controller may operate in a low-battery mode when the magnitude of the battery voltage $V_{BATT}$ is getting low. Specifically, if the magnitude of the battery voltage $V_{BATT}$ has dropped below a first battery-voltage threshold $V_{B-TH1}$ at step 726, the controller may begin at step 728 to operate in the low-battery mode during which the controller may operate the motor at a reduced speed (e.g., at half speed). If the magnitude of the battery voltage $V_{BATT}$ is less than or equal to a second battery-voltage threshold $V_{B-TH2}$ at step 730, the controller may allow for one last movement of the covering material to the fully-open position $P_{FULLY-OPEN}$ by setting a FINAL_MOVE flag in memory at step 732. At step 734, the controller may shut down all unnecessary loads of the motor drive unit (e.g., the RF receiver 350, etc.) and prevent the motor from moving the covering material except for one last movement to the fully-open position $P_{FULLY-OPEN}$. If the magnitude of the battery voltage $V_{BATT}$ is less than or equal to the third battery-voltage threshold $V_{B-TH3}$ at step 736, the controller may shut itself down at step 738 such that no other circuits in the motor drive unit may consume any power to thus protect against any potential leakage of the batteries. Otherwise, the motor control procedure 700 may exit.

Figure 20:
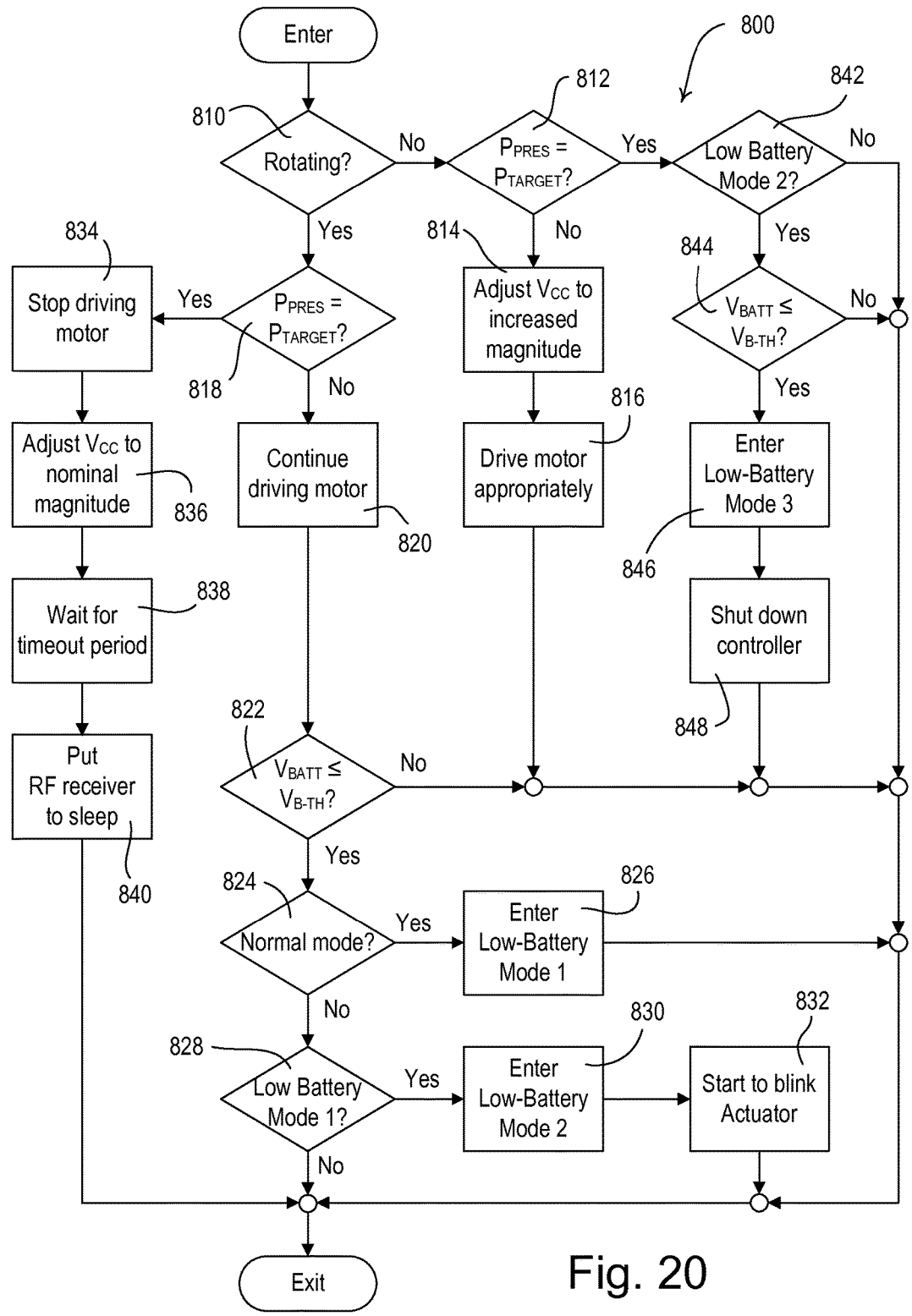
FIG. 20 is a simplified flowchart of another example motor control procedure executed periodically by a controller of a motor drive unit of a motorized window treatment.

FIG. 20 is a simplified flowchart of another example motor control procedure 800, which may be executed periodically (e.g., every two milliseconds) by a controller of a motor drive unit (e.g., the controller 310 of the motor drive unit 300) for controlling a motor (e.g., the motor 312). If the motor is not presently rotating at step 810 and the present position $P_{PRES}$ is not equal to the target position $P_{TARGET}$ at step 812, the controller may control the voltage adjustment control signal $V_{ADJ}$ to adjust the magnitude of the DC supply voltage $V_{CC}$ to the increased magnitude at step 814. The controller may then drive the motor appropriately at step 816 to move the covering material towards the target position $P_{TARGET}$ and the motor control procedure 800 may exit.

If the motor is presently rotating at step 810, but the present position $P_{PRES}$ is not yet equal to the target position $P_{TARGET}$ at step 818, the controller may continue to drive the motor appropriately at step 820. The controller may then compare the magnitude of the battery voltage $V_{BATT}$ (e.g., the generated battery voltage sample) to the battery-voltage threshold $V_{B-TH}$ at step 822. If the magnitude of the battery voltage $V_{BATT}$ is less than or equal to the battery-voltage threshold $V_{B-TH}$ at step 822 and the controller is operating in the normal mode at step 824, the controller may begin operating in the first low-battery mode at step 826 during which the controller may operate the motor at a reduced speed (e.g., at half speed). If the controller is not operating in the normal mode at step 824, but is operating in the first low-battery mode at step 828, the controller may begin operating in the second low-battery mode at step 830 during which the controller may stop driving the motor. The controller may then begin to blink an LED (e.g., the LED 372) to provide feedback that the battery voltage $V_{BATT}$ is low at step 832, and the motor control procedure 800 exits.

When the present position $P_{PRES}$ becomes equal to the target position $P_{TARGET}$ at step 818, the controller may stop driving the motor at step 834 and may control the voltage adjustment control signal $V_{ADJ}$ to adjust the magnitude of the DC supply voltage $V_{CC}$ to the nominal magnitude at step 836. The controller may then wait for a timeout period (e.g., approximately 200 milliseconds) at step 838, and puts the RF receiver to sleep at step 840. If the motor is not presently rotating at step 810 and the present position $P_{PRES}$ is equal to the target position $P_{TARGET}$ at step 812, the controller may monitor the magnitude of the battery voltage $V_{BATT}$ when the controller is operating in the second low-battery mode at step 842. If the magnitude of the battery voltage $V_{BATT}$ is less than or equal to the battery-voltage threshold $V_{B-TH}$ at step 844 when the controller is operating in the second low-battery mode at step 842, the controller may begin operating in the third low-battery mode at step 846 and shut down (e.g., hibernate) at step 848, such that the circuitry of the motor drive unit draws a minimal amount of current from the batteries and the batteries are protected against potential leakage. While the controller may check the to see if the magnitude of the battery voltage $V_{BATT}$ is less than or equal to the battery-voltage threshold $V_{B-TH}$ every time that the motor control procedure 800 is executed (e.g., every two milliseconds) when the controller is operating in the second low-battery mode, the controller may alternatively monitor the magnitude of the battery voltage $V_{BATT}$ in the second low-battery mode as part of a separate procedure that may be executed less often, for example, every hour.

Figure 21:
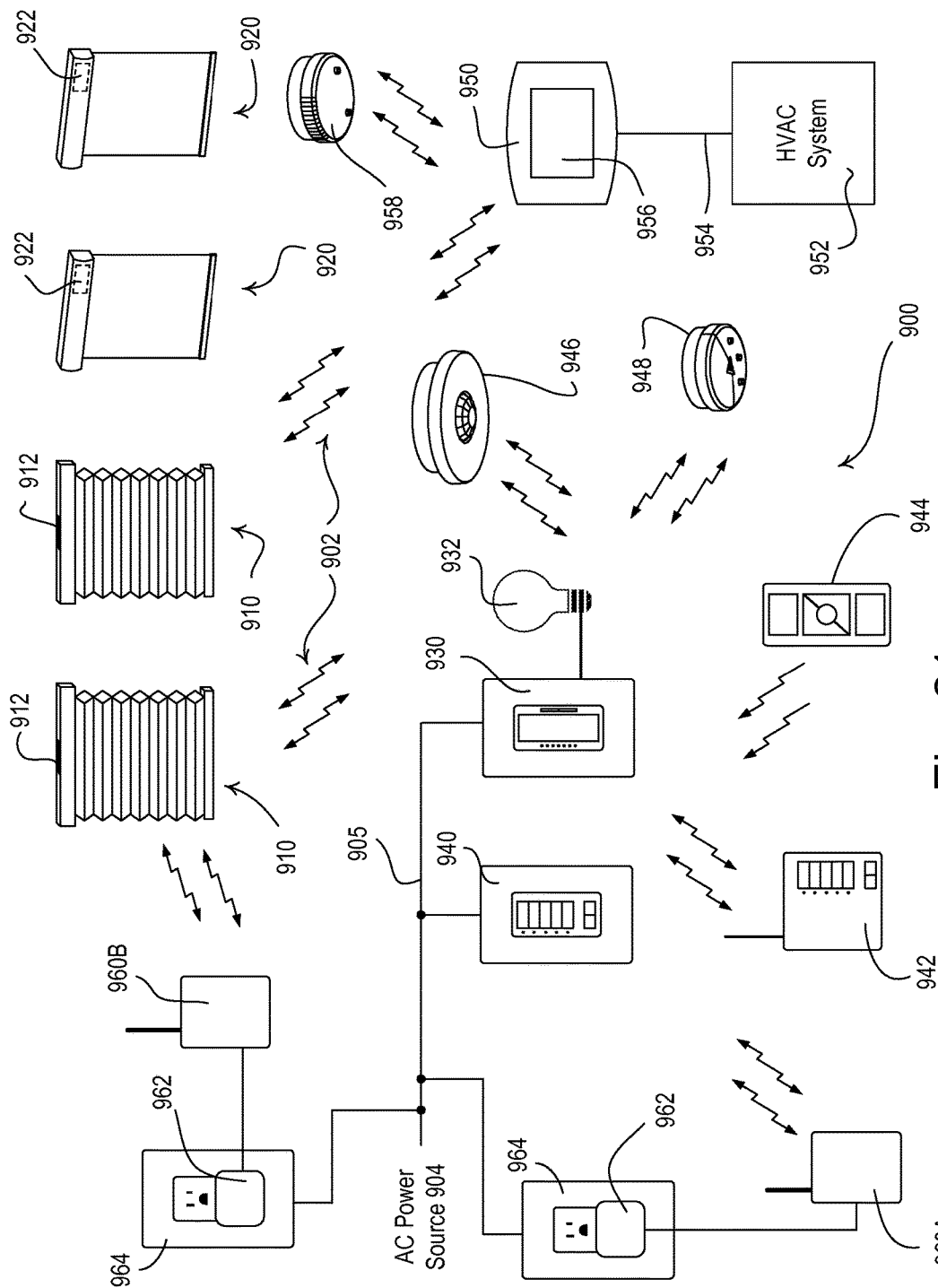
FIG. 21 is a simplified diagram of a radio-frequency load control system including multiple motorized window treatments.

FIG. 21 is a simplified diagram of a radio frequency (RF) load control system 900 having multiple battery-powered motorized window treatments, e.g., battery-powered motorized cellular shades 910 and/or battery-powered motorized roller shades 920. The motorized cellular shades 910 may each have a very similar structure as the battery-powered motorized window treatment 110 shown in FIG. 1). The motorized roller shades 920 may each have a very similar structure as the battery-powered motorized roller shade 210 shown in FIG. 8). The motorized cellular shades 910 and the motorized roller shades 920 may comprise respective motor drive units 912, 922, which each may have a very similar structure as the motor drive unit 300 shown in FIG. 11. However, the motor drive units 912, 922 may each comprise an RF transceiver (not shown) rather than the RF receiver 350, such that the motorized cellular shades 910 and the battery-powered motorized roller shades 920 of the load control system 900 are operable to both transmit and receive RF signals 906. The control devices of the load control system 900 may be configured to transmit packets using a packet time period $T_{PACKET}$ (e.g., approximately 5 msec) and a packet break time period $T_{PKT\_BRK}$ (e.g., approximately 70 msec).

The motorized window treatments of the load control system 100 (e.g., the motorized cellular shades 910 and/or the battery-powered motorized roller shades 920) may each be configured to enable the RF transceiver at a sampling period $T_{SAMPLE}$ (e.g., approximately 17.8 msec) to detect if an RF signal 906 is presently being transmitted. Each motorized window treatment may be configured to put the RF transceiver to sleep for an RF sleep time period $T_{SLP-RF}$ that may be much longer than the packet time period $T_{PACKET}$ (e.g., approximately 17.3 msec) and to enable an RF transceiver for the RF sample time period $T_{SMPL-RF}$ that may be much shorter than the packet time period $T_{PACKET}$ (e.g., approximately 5 msec) so as to conserve battery power. The motorized window treatments may each execute an RF signal receiving procedure similar to the RF signal receiving procedure 400 of as shown in FIG. 13. However, the motorized window treatments of the load control system 900 may not put the RF transceiver to sleep for the snooze time period $T_{SNOOZE}$ after detecting an RF signal during the RF sample time period $T_{SMPL-RF}$. Rather, the motorized window treatments of the load control system 900 may simply remain on after detecting an RF signal during the RF sample time period $T_{SMPL-RF}$.

As shown in FIG. 17, the load control system 900 may also comprise a lighting control device, e.g., a wall-mountable dimmer switch 930, which may be coupled to an alternating-current (AC) power source 904 via a line voltage wiring 905. The dimmer switch 930 may be configured to adjust the amount of power delivered to a lighting load 932 to control the lighting intensity of the lighting load. The dimmer switch 930 may be configured to transmit and receive digital messages via the RF signals 906 and adjust the lighting intensity of the lighting load 932 in response to the digital messages received via the RF signals. The dimmer switch 930 may enable its RF transceiver at a sampling period $T_{SAMPLE}$ (e.g., approximately 17.8 msec) using, for example, a duty cycle of approximately 50%, such that the dimmer switch 930 may enable the RF transceiver for an RF sample time period $T_{SMPL-RF}$ (e.g., approximately 8.9 msec), and put the RF transceiver to sleep for an RF sleep time period $T_{SLP-RF}$ (e.g., approximately 8.9 msec). Accordingly, the RF sleep time period $T_{SLP-RF}$ used by the dimmer switch 930 may be longer than the packet time period $T_{PACKET}$ so as to reduce the total power consumed by the dimmer switch 930.

The load control system 900 may further comprise a wall-mounted button keypad 940 and a battery-powered tabletop button keypad 942. The wall-mounted button keypad 940 may be powered from the AC power source 904 via the line voltage wiring 905, and the tabletop button keypad 942 may be a battery-powered device. Both of the keypads 940, 942 may transmit digital messages to the dimmer switch 930 via the RF signals 906 in order to provide for remote control of the lighting load 932. In addition, each of the keypads 940, 942 may be configured to receive digital status messages via the RF signals 906 from the dimmer switch 930 in order to display the status (e.g., on/off state and/or intensity level) of the lighting load 932. The load control system 900 may further comprise a battery-powered remote control 944, which may be configured to transmit digital messages to the dimmer switch 930 via the RF signals 906 in order to provide for remote control of the lighting load 932. The wall-mounted button keypad 940, the tabletop button keypad 942, and the remote control 944 may also be configured to adjust the present position $P_{PRES}$ of the motorized window treatments (e.g., the motorized cellular shades 910 and/or the battery-powered motorized roller shades 920) by transmitting digital messages via the RF signals 906. In addition, the motorized window treatments may be configured to transmit status information to the wall-mounted keypad 940 and tabletop button keypad 942.

The load control system 900 may further comprise a battery-powered wireless occupancy sensor 946 for detecting an occupancy condition (i.e., the presence of an occupant) or a vacancy condition (i.e., the absence of an occupant) in the space in which the occupancy sensor is mounted. The occupancy sensor 946 may be configured to wirelessly transmit digital messages via the RF signals 906 to the dimmer switch 930 in response to detecting the occupancy condition or the vacancy condition in the space. For example, in response to detecting an occupancy condition in the space, the occupancy sensor 946 may transmit a digital message to the dimmer switch 930 to cause the dimmer switch to turn on the lighting load 932, and in response to detecting a vacancy condition in the space, transmit a digital message to the dimmer switch to cause the dimmer switch to turn off the lighting load. Alternatively, the occupancy sensor 946 may be implemented as a vacancy sensor, such that the dimmer switch 930 may only operate to turn off the lighting load 932 in response to receiving the vacant commands from the vacancy sensor. Examples of RF load control systems having occupancy and vacancy sensors are described in greater detail in commonly-assigned U.S. Pat. No. 7,940,167, issued May 10, 2011, entitled BATTERY-POWERED OCCUPANCY SENSOR; U.S. Pat. No. 8,009, 042, issued Aug. 30, 2011, entitled RADIO-FREQUENCY LIGHTING CONTROL SYSTEM WITH OCCUPANCY SENSING; and U.S. Pat. No. 8,199,010, issued Jun. 12, 2012, entitled METHOD AND APPARATUS FOR CONFIGURING A WIRELESS SENSOR; the entire disclosures of which are hereby incorporated by reference.

The load control system 900 may further comprise a battery-powered daylight sensor 948 for measuring an ambient light intensity in the space in which the daylight sensor in mounted. The daylight sensor 948 may wirelessly transmit digital messages via the RF signals 906 to the dimmer switch 930. For example, the daylight sensor 948 may transmit a digital message to the dimmer switch 930 to cause the dimmer switches to increase the intensities of the lighting load 932 if the ambient light intensity detected by the daylight sensor 948 is less than a setpoint light intensity, and to decrease the intensities of the lighting load if the ambient light intensity is greater than the setpoint light intensity. The packet break time period $T_{PKT\_BRK}$ of the packets transmitted by the daylight sensor 948 may be variable, for example, as a function of the measured light intensity. The motorized window treatments of the load control system 100 may be configured to receive digital messages from the occupancy sensor 946 and the daylight sensor 948 via the RF signals 906 and to adjust the present position of the window treatments. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR, and U.S. Pat. No. 8,451,116, issued May 28, 2013, entitled WIRELESS BATTERY-POWERED DAYLIGHT SENSOR, and, the entire disclosures of which are hereby incorporated by reference.

The load control system 900 may further comprise a battery-powered temperature control device 950 (e.g., a thermostat) that may be configured to control a heating and/or cooling system, e.g., a heating, ventilation, and air conditioning (HVAC) system 952. The temperature control device 950 may be coupled to the HVAC system 952 via an HVAC communication link 954, e.g., a digital communication link (such as an RS-485 link, an Ethernet link, or a BACnet® link), or alternatively via a wireless communication link (such as an RF communication link). The temperature control device 950 may comprise an internal temperature sensor for determining a present temperature in the space in which the temperature control device is located. The temperature control device 950 may transmit appropriate digital messages to the HVAC system 952 to control the present temperature in the building towards a setpoint temperature. Alternatively, the HVAC communication link 954 may comprise a more traditional analog control link for simply turning the HVAC system 952 on and off. The temperature control device 950 may comprise a user interface (e.g., a touch screen 956) for displaying the present temperature and the setpoint temperature, and for receiving user inputs for adjusting the setpoint temperature. The temperature control device 950 may be configured to receive RF signals 906 from a wireless temperature sensor 958 for determining the present temperature in the space, for example, at a location away from the temperature control device 950.

Each of the battery-powered devices of the load control system 900 (e.g., the tabletop button keypad 942, the remote control 944, the occupancy sensor 946, the daylight sensor 948, and the temperature control device 950) may be configured to enable their respective RF transceivers at a sampling period $T_{SAMPLE}$ (e.g., approximately 17.8 msec) to detect if an RF signal 906 is presently being transmitted as described above for the motorized window treatments 910. Each of these battery-powered devices may be configured put its RF transceiver to sleep for an RF sleep time period $T_{SLP\_RF}$ that may be much longer than the packet time period $T_{PACKET}$ (e.g., approximately 5 msec) and to enable the RF transceiver for the RF sample time period $T_{SMPL\_RF}$ that may be much shorter than the packet time period $T_{PACKET}$ (e.g., approximately 17.3 msec) so as to conserve battery power.

The load control system 900 may further comprise signal repeaters 960A, 960B, which may be configured to retransmit any received digital messages to ensure that all of the control devices of the load control system receive all of the RF signals 906. The load control system 900 may comprise, for example, one to five signal repeaters depending upon the physical size of the system. Each of the control devices (e.g., the motorized window treatments 910, the dimmer switch 930, the tabletop button keypad 942, the wall-mounted button keypad 940, the occupancy sensor 946, the daylight sensor 948, and the temperature control device 950) of the load control system 900 may be located within the communication range of at least one of the signal repeaters 960A, 960B. The signal repeaters 960A, 960B may be powered by the AC power source 904 via power supplies 962 plugged into electrical outlets 964.

One of the signal repeaters (e.g., signal repeater 960A) may operate as a "main" repeater (e.g., a main controller) to facilitate the operation of the load control system 900. The main repeater 960A may have a database, which may define the operation of the load control system, stored in memory. For example, the main repeater 960A may be configured to determine which of the lighting load 932 is energized and to use the database to control any visual indicators of the dimmer switch 930 and the keypads 942, 940 to provide the appropriate feedback to the user of the load control system 900. In addition, the control devices of the load control system may be configured to transmit status information to the signal repeaters 960A, 960B. For example, the motor drive unit 912, 922 of each of the motorized window treatments may be configured to transmit a digital message representative of the magnitude of the respective battery voltage to the signal repeaters 960A, 960B, a digital message including a low-battery indication to the signal repeaters when operating in the low-battery mode, or a digital message including a representation of the present position $P_{PRES}$ of the motorized window treatment.

As mentioned above, the load control system 900 may comprise one to five signal repeaters depending upon the physical size of the system. The control devices of the load control system 900 may each be configured to adjust the RF sampling period $T_{SAMPLE}$ in response to the total number $N_{RPTR}$ of signal repeaters within the load control system 900. Specifically, each control device may be configured to adjust the RF sleep time period $T_{SLP\_RF}$, while keeping the RF sampling time period $T_{SMPL\_RF}$ constant. The control devices may adjust the respective sampling periods because packets of data may be transmitted differently via the RF signals 906 depending on the number of repeaters in the load control system 900. In particular, the packet break time period $T_{PKT\_BRK}$ of the data transmissions may vary in response to the number of repeaters to ensure that the signal repeaters in the load control system 900 have sufficient time to propagate a given packet. Because the packet break time period $T_{PKT\_BRK}$ may be a factor in appropriately sizing the RF sleep time period $T_{RF\_SLEEP}$ of each of the control devices to ensure that an RF sampling event coincides with a packet transmission as discussed above with respect to FIG. 14, the RF sleep time period $T_{RF\_SLEEP}$ may also vary accordingly if the packet break time period $T_{PKT\_BRK}$ of a transmitted packet varies.

An example of an RF load control system comprising battery-powered motorized window treatments and other battery-powered control devices is described in greater detail in commonly-assigned U.S. Patent Application Publication No. 2012/0281606, published Nov. 8, 2012, entitled LOW-POWER RADIO-FREQUENCY RECEIVER, the entire disclosure of which is hereby incorporate by reference.

While the present invention has been described with reference to the battery-powered motorized window treatments 110 having the cellular shade fabric 112 and the battery-powered roller shades 210 having shade fabric 222, the concepts of the present invention could be applied to other types of motorized window treatments, such as, for example, draperies, Roman shades, Venetian blinds, and tensioned roller shade systems. An example of a drapery system is described in greater detail in commonly-assigned U.S. Pat. No. 6,994,145, issued Feb. 7, 2006, entitled MOTORIZED DRAPERY PULL SYSTEM, the entire disclosure of which is hereby incorporated by reference. An example of a Roman shade system is described in greater detail in commonly-assigned U.S. patent application Ser. No. 12/784,096, filed Mar. 20, 2010, entitled ROMAN SHADE SYSTEM, the entire disclosure of which is hereby incorporated by reference. An example of a Venetian blind system is described in greater detail in commonly-assigned U.S. patent application Ser. No. 13/233,828, filed Sep. 15, 2011, entitled MOTORIZED VENETIAN BLIND SYSTEM, the entire disclosure of which is hereby incorporated by reference. An example of a tensioned roller shade system is described in greater detail in commonly-assigned U.S. Pat. No. 8,056,601, issued Nov. 15, 2011, entitled SELF-CONTAINED TENSIONED ROLLER SHADE SYSTEM, the entire disclosure of which is hereby incorporated by reference.

Additional procedures for controlling motorized window treatments are described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, and U.S. Pat. No. 8,901,769, issued Dec. 2, 2014, entitled LOAD CONTROL SYSTEM HAVING AN ENERGY SAVINGS MODE, the entire disclosures of which are hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A motorized window treatment comprising:
a headrail having first and second opposite ends;
a covering material having a top end connected to the headrail, the covering material further having a bottom end;
a motor drive unit including a motor and located in the headrail;
first and second drive shafts extending from both sides of the motor drive unit and rotatably coupled to the motor drive unit thereby allowing rotations of the motor to result in rotations of the drive shafts;
first and second lift cords, the first lift cord located proximate to the first opposite end of the headrail and the second lift cord located proximate to the second opposite end of the headrail, each lift cord rotatably received around a respective one of the drive shafts and connected to the bottom end of the covering material; and
first and second battery packs configured to hold respective first and second batteries for powering the motor drive unit, the first and second battery packs located on respective sides of the motor drive unit, the first battery pack located between the first opposite end of the headrail and the first lift cord, and the second battery pack located between the second opposite end of the headrail and the second lift cord;
wherein the motor drive unit is configured to rotate the first and second drive shafts to adjust the bottom end of the covering material between a closed position and an open position in response to rotations of the drive shaft.

2. The motorized window treatment of claim 1, wherein the motor drive unit further comprises a controller and a transistor-bridge drive circuit, the controller configured to provide a pulse width modulated (PWM) control signal to the drive circuit for driving the motor to control a rotational speed of the motor so as to cause the transistor-bridge drive circuit to conduct a pulse-width modulated load current.

3. The motorized window treatment of claim 2, further comprising:
a battery-powered supply that includes the first and second batteries and generates a battery voltage.

4. The motorized window treatment of claim 3, further comprising:
a filter circuit having an input electrically coupled to the battery-powered supply to receive the battery voltage, and an output electrically coupled to the transistor-bridge circuit to conduct the pulse-width modulated load current;
wherein the filter circuit is configured to conduct a substantially DC battery current from the battery-powered supply.

5. The motorized window treatment of claim 2, wherein the controller is configured to ramp the rotational speed up from zero to a desired rotational speed across a ramp time when starting the motor from a stopped condition.

6. The motorized window treatment of claim 2, wherein the transistor-bridge drive unit comprises an H-Bridge drive unit configured to control the rotational speed and direction of the motor.

7. The motorized window treatment of claim 2, wherein the controller is configured to increase a duty cycle of the PWM control signal as the covering material is raised from a midway position to the-open position and when the covering material is lowered from the midway position to the-closed position.

8. The motorized window treatment of claim 2, further comprising:
a power supply for receiving the battery voltage and generating a DC supply voltage having a first magnitude for powering the controller;
wherein the controller is configured to increase a magnitude of the DC supply voltage to a second increased magnitude greater than the first magnitude when the controller is driving the motor drive circuit to rotate the drive shaft.

9. The motorized window treatment of claim 1, wherein the motor drive unit is configured to monitor a magnitude of a battery voltage of a battery-powered supply and operate in a low-battery mode when the magnitude of the battery voltage drops below a first predetermined low-battery threshold.

10. The motorized window treatment of claim 2, wherein the controller is configured to begin operating in a first low-battery mode when a magnitude of a battery voltage of a battery-powered supply drops below a first predetermined low-battery threshold, the controller configured to operate the motor at a reduced motor speed in the first low-battery mode;
wherein the controller is configured to begin operating in a second low battery mode when the magnitude of the battery voltage drops below the first predetermined low-battery threshold a second time, the controller configured to stop the rotation of the motor in the second low-battery mode; and
wherein the controller is configured to begin operating in a third low-battery mode when the magnitude of the battery voltage drops below the first predetermined low-battery threshold a third time, the controller configured to shut down in the third low-battery mode so that approximately no current is drawn from the battery-powered supply.

11. The motorized window treatment of claim 1, wherein the motor drive unit is configured to operate the motor at a reduced motor speed in a low-battery mode.

12. The motorized window treatment of claim 11, wherein the motor drive unit is configured to prevent movements of the covering material in the low-battery mode except to allow for one additional movement of the covering material to the open position.

13. The motorized window treatment of claim 1, wherein the motor drive unit is configured to prevent the motor from operating to lower the covering material until an upper limit for the covering material is reset after a loss of power.

14. The motorized window treatment of claim 1, wherein each of the battery packs comprises a plurality of batteries electrically coupled in series.

15. The motorized window treatment of claim 14, wherein the series-coupled batteries of the first battery pack are electrically coupled in series with a first diode and the series-coupled batteries of the second battery pack are electrically coupled in series with a second diode; and
wherein the series combination of the first diode and the batteries of the first battery pack is electrically coupled in parallel with the series combination of the second diode and the batteries of the second battery pack so as to generate a battery voltage across the parallel combination of diodes and batteries.

16. The motorized window treatment of claim 15, wherein cathodes of the first and second diodes are electrically coupled together to produce the battery voltage at a junction of the first and second diodes.

17. The motorized window treatment of claim 16, wherein the junction of the first and second diodes and a common reference of the battery packs are electrically coupled to the motor drive unit via two respective electrical wires, the motorized window treatment further comprising:
an antenna for receiving RF signals, the antenna extending from the motor drive unit adjacent to the electrical wires that extend between the battery packs and the motor; and
at least one ferrite bead mechanically coupled around the electrical wires that extend between the battery packs and the motor and positioned adjacent the motor drive unit.

18. The motorized window treatment of claim 14, wherein the series-coupled batteries of the first battery pack are electrically coupled in series with the series-coupled batteries of the second battery pack so as to generate a battery voltage across the series combination of battery packs.

19. The motorized window treatment of claim 14, wherein the batteries comprise D-cell batteries.

20. The motorized window treatment of claim 14, wherein the motor drive unit comprises a positive-temperature coefficient thermistor electrically coupled in series with the batteries to limit current drawn from the batteries.

21. The motorized window treatment of claim 2, wherein the motor drive unit further comprises a rotational position sensor coupled to the drive shaft to enable the motor drive unit to sense movement of the drive shaft and determine a position of the bottom end of the covering material.

22. The motorized window treatment of claim 21, wherein the covering material may be engaged by a user to manually adjust the covering material, the motor drive unit configured to determine a position of the covering material when the covering material is manually adjusted.

23. The motorized window treatment of claim 22, wherein the motor produces an electromotive force when the covering material is manually adjusted, the electromotive force being coupled to an input of the controller to cause the controller to change from a sleep mode to an active mode and allow the controller to receive and process a sensor signal received from the rotational position sensor to determine the position of the bottom end of the covering material when the covering material is manually adjusted.

24. The motorized window treatment of claim 21, further comprising:
a supplemental power source configured to power the controller; and
a memory configured to store data related to the determined position to prevent loss of the position data when the batteries are removed from the battery packs.

25. The motorized window treatment of claim 1, further comprising:
a spring assist assembly mechanically coupled to the drive shaft to provide torque on the drive shaft in a direction opposite a direction of a torque provided on the drive shaft by the lift cords.

26. The motorized window treatment of claim 25, wherein the spring assist assembly comprises one of a constant-force spring and a negative-gradient spring.

27. The motorized window treatment of claim 1, wherein the motor drive unit further comprises a gear assembly operatively coupled to an output shaft of the motor and two output gears located on each side of the motor drive unit, each of the output gears coupled to one of the drive shafts, the motor drive unit further comprising a coupling member coupled between the gear assembly and the output gears to enable rotations of the output shaft of the motor to result in rotations of the drive shafts.

* * * * *